(12) United States Patent
Turner et al.

(10) Patent No.: US 8,939,250 B2
(45) Date of Patent: Jan. 27, 2015

(54) SELF-POWERED APPARATUS

(71) Applicant: Deere & Company, Moline, IL (US)

(72) Inventors: Christopher Turner, Waterloo, IA (US); Kendall Giesmann, Waverly, IA (US); Steven A. Duppong, Cedar Falls, IA (US); Bryan K. Buerkle, Cedar Falls, IA (US); Nicholas Adam Taylor, Sandy, UT (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/839,504

(22) Filed: Mar. 15, 2013

(65) Prior Publication Data

US 2014/0262591 A1 Sep. 18, 2014

(51) Int. Cl.
*B60P 1/64* (2006.01)
*B62D 21/18* (2006.01)

(52) U.S. Cl.
CPC ............. *B62D 21/18* (2013.01); *B60P 1/649* (2013.01)
USPC ................ 180/312; 280/781; 410/122

(58) Field of Classification Search
CPC ......... B60P 1/649; B60P 1/64; B60P 1/6409; B60P 1/6427; B60P 1/435; B60P 1/00; B60P 7/13; B60P 7/135; B65D 88/129
USPC ................. 180/311, 312; 280/781, 789, 107; 414/679; 410/122, 123, 2, 121; 296/182.1; 108/55.3, 55.1
See application file for complete search history.

(56) References Cited

U.S. PATENT DOCUMENTS

| | | | |
|---|---|---|---|
| 2,746,760 A | | 5/1956 | Wolf |
| 3,043,604 A | * | 7/1962 | Rehnberg et al. ............... 280/43 |
| 3,893,533 A | * | 7/1975 | Tidwell ........................... 180/21 |
| 4,422,685 A | | 12/1983 | Bonfilio et al. |
| 4,455,032 A | * | 6/1984 | Kajikawa ...................... 280/276 |
| 4,854,772 A | * | 8/1989 | Sinkkonen .................... 404/121 |
| 5,226,696 A | | 7/1993 | Klages et al. |
| 5,562,390 A | * | 10/1996 | Christenson .................. 414/477 |
| 5,725,231 A | * | 3/1998 | Buie .......................... 280/455.1 |

(Continued)

FOREIGN PATENT DOCUMENTS

| WO | 2009017533 | 2/2009 |
|---|---|---|
| WO | 2010046905 | 4/2010 |

OTHER PUBLICATIONS

Pioneer Equipment Inc, "The Pioneer Hybrid PTO Cart" retrieved from the internet: http://www.pioneerfarmequipment.com/pioneer%20pto%20carts.htm, last visited Sep. 17, 2013, 3 pages.
Pioneer Farm Equipment, "Pioneer PTO Carts," http://www.pioneerfarmequipment.com/pioneer%20pto%20carts.htm, accessed on Aug. 4, 2014, 3 pages.

(Continued)

*Primary Examiner* — Keith Frisby
(74) *Attorney, Agent, or Firm* — Hanley, Flight & Zimmerman, LLC

(57) ABSTRACT

Self-powered apparatus are disclosed. An example apparatus includes a front chassis portion and a rear chassis portion. The front chassis portion is to be coupled to the rear chassis portion. The front chassis portion is substantially the same as the rear chassis portion. When the front and rear chassis portions are coupled, the front chassis portion includes a first end of the apparatus and the rear chassis portion includes a second end of the apparatus.

22 Claims, 28 Drawing Sheets

(56) References Cited

U.S. PATENT DOCUMENTS

| | | | |
|---|---|---|---|
| 6,298,802 B1 * | 10/2001 | Brignolio | 114/344 |
| 6,647,913 B2 * | 11/2003 | Brignolio | 114/344 |
| 6,783,187 B2 * | 8/2004 | Parsons | 298/22 R |
| 6,791,329 B2 * | 9/2004 | Nelson | 324/329 |
| 8,239,078 B2 * | 8/2012 | Siddappa et al. | 701/19 |
| 2007/0212205 A1 * | 9/2007 | Lowecki | 414/498 |
| 2012/0273285 A1 | 11/2012 | Jensen et al. | |

OTHER PUBLICATIONS

International Searching Authority, "International Search Report," issued in connection with PCT Application U.S. Appl. No. PCT/US2014/028140, mailed Sep. 25, 2014, 5 pages.

International Searching Authority, "Written Opinion," issued in connection with PCT Application Serial No. PCT/US2014/028140, mailed Sep. 25, 2014, 12 pages.

\* cited by examiner

SELF-POWERED APPARATUS

FIELD OF THE INVENTION

This disclosure relates generally to self-powered apparatus.

BACKGROUND OF THE INVENTION

A machine for construction, agricultural, or domestic applications may be powered by an electric motor, an internal combustion engine, or a hybrid power plant including an electric motor and an internal combustion engine. In some examples, an operator may control the machine to harvest crops and/or plant seeds, or accomplish some other task in a work area.

SUMMARY

An apparatus in accordance with the teachings of this disclosure includes a front chassis portion and a rear chassis portion. The front chassis portion is to be coupled to the rear chassis portion. The front chassis portion is substantially the same as the rear chassis portion. When the front and rear chassis portions are coupled, the front chassis portion is to include a first end of the apparatus and the rear chassis portion is to include a second end of the apparatus.

Another apparatus in accordance with the teachings of this disclosure includes a frame to be coupled to a vehicle. The frame includes a first interface on a first side of the frame. The first interface is to receive a first side portion of a container. The frame includes a second interface on a second side of the frame. The second interface to receive a second side portion of the container. The frame includes an aperture to which an end of a hydraulic cylinder is to be coupled.

Another apparatus in accordance with the teachings of this disclosure includes a front axle, a rear axle, a frame coupling the front axle and the rear axle and an engine cradle coupled to the frame and positioned between the front axle and the rear axle. A longitudinal axis of the engine cradle is transverse to a longitudinal axis of the frame.

DETAILED DESCRIPTION

Figure 1:
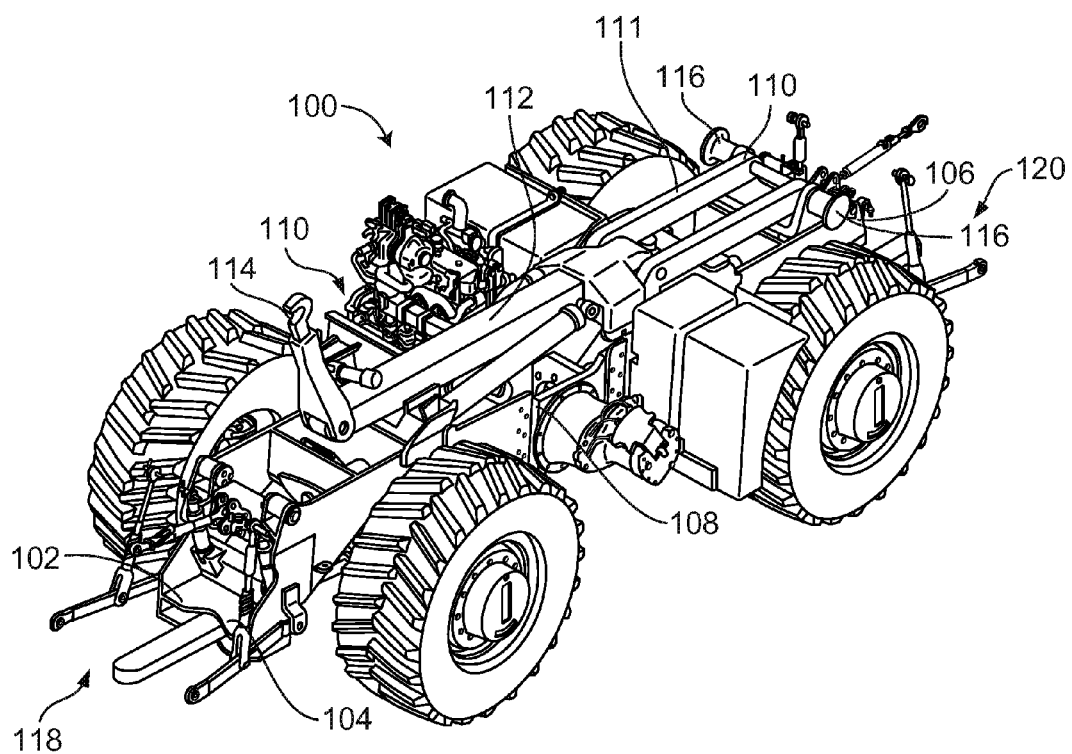
FIG. 1 depicts a perspective view of an example apparatus in accordance with the teachings of this disclosure with one or more body panels removed.

The examples disclosed herein relate to example modular power units, self-powered machines, tractors, machine forms and/or autonomous machines that may be used in a number of applications such as agricultural applications, construction applications, residential applications, commercial applications, etc. In some examples, the example modular power units include a symmetrical frame front to back and/or left to right. Thus, in contrast to some existing machinery, the examples disclosed herein reduce the complexity and/or cost of designing, manufacturing and/or assembling the example apparatus and/or the service parts associated therewith. For example, using the examples disclosed herein, a frame side portion and/or a large frame section may be used four times per machine. Thus, the number of different parts used to produce a single machine may be relatively low (e.g., ⅓ less parts).

In some examples, a front portion of the example frame includes substantially identical side frames (e.g., a left side frame and a right side frame) that are coupled and/or welded together using substantially identical spanning parts. In some examples, the rear portion of the example frame includes substantially identical side frames (a left side frame and a right side frame) that are coupled and/or welded together using substantially identical spanning parts. Thus, in some such examples, the example frame is symmetric across a transverse axis of the frame and symmetric across a longitudinal axis of the frame. The front and rear frame portions may be coupled using a center section, a drive train frame, a casting, sheet metal or directly to one another. The center section may be symmetric front to back and/or left to right.

The frame may include a plurality of attachments and/or interfaces. For example, the frame may include three-point hitch(es), axle mounting area(s), drawbar(s), fixed and/or pivotable drawbar(s), oscillating axle(s), fixed axle(s), bull dozer interface(s), side dresser(s) (e.g., ground engaging) and/or top interface(s). The top interface may include a hook and pull system including a catch/tank receiver for receiving a payload and/or mounting one or more hydraulic cylinders, a conveyor system for receiving a payload and/or stand offs for receiving a payload.

In some examples, by making the frame substantially symmetric and/or including an electric powertrain, an engine may be mounted and/or coupled between and/or centered substantially parallel to the drive axles of the modular power unit. Thus, the engine may be positioned relatively low within the modular power unit. The low placement of the engine enables the modular power unit to have a relatively low center of gravity, relatively high stability, a relatively short wheel base, relatively high agility and/or relatively even weight distribution front to back. Additionally or alternatively, mounting and/or centering the engine between the drive axles enables the top of the modular power unit to include a top interface, different interfaces and/or be free for other uses. For example, the top of the modular power unit may include a hook and pull system including a catch/tank receiver for receiving a payload and/or mounting one or more hydraulic cylinders, a conveyor system for receiving a payload and/or stand offs for receiving a payload.

In some examples, electric and/or hydraulic power may be used in the modular power unit to enable the drive system to be positioned substantially parallel to the axles. The axles may be oscillating axles, fixed axles, etc. In other examples, the apparatus may not include an oscillating axle and oscillation may be obtained through an Independent Link Suspension (ILS®) style axle and/or oscillation in a center section. To provide mechanical drive to the axles, a differential and gear box may be positioned and/or coupled at an end of the gear box. Belts may be used to secure the engine between the axles and/or change the direction of power. In other examples, the engine may be positioned and/or hung in front of the front axle to enable the top of the modular power unit to include a top interface, different interfaces and/or to be free for other uses. However, positioning the engine in front of the front axle decreases the balance and/or even weight distribution of the apparatus.

Figure 2:
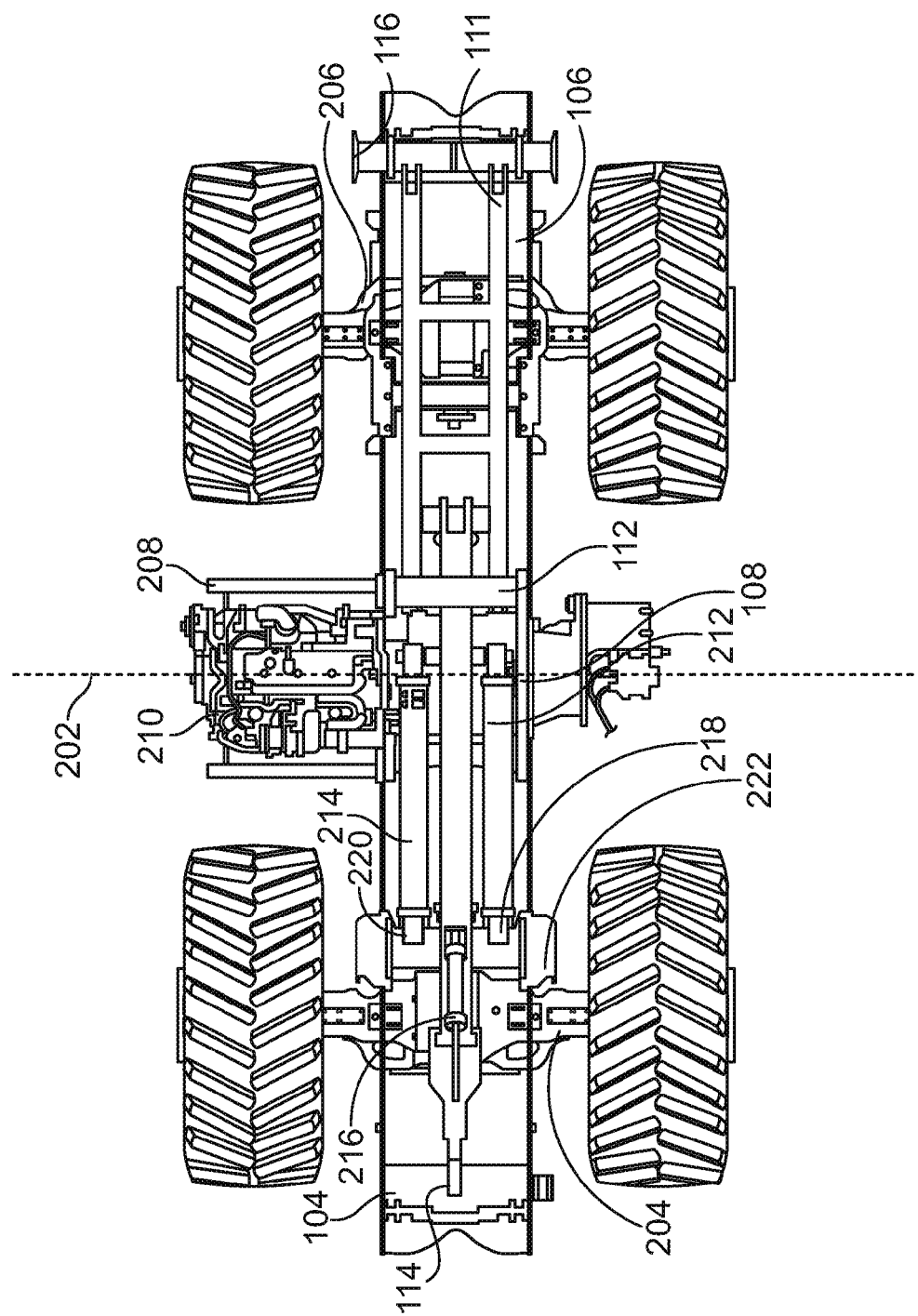
FIG. 2 depicts a plan view of the example apparatus of FIG. 1.
Figure 3:
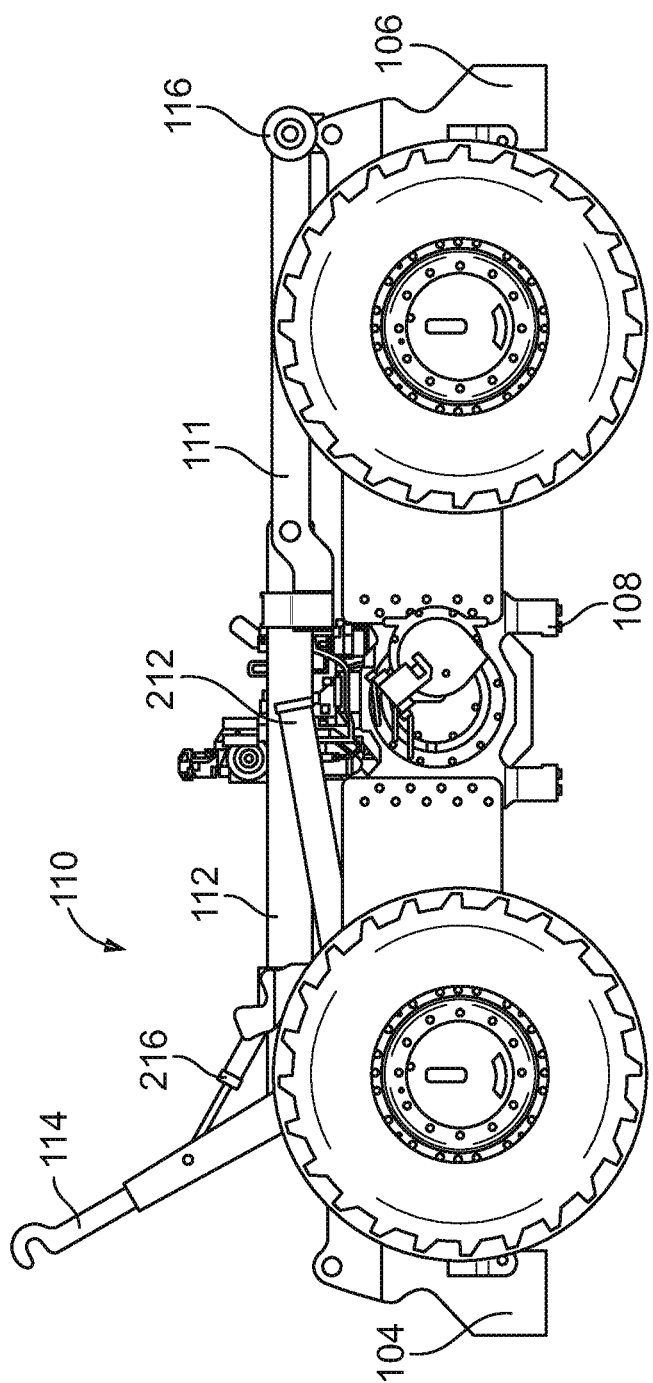
FIG. 3 depicts an elevational view of the example apparatus of FIG. 1.

FIGS. 1-3 depict different views of an example apparatus, vehicle, modular power unit and/or self-powered machine 100 in accordance with the teachings of this disclosure. As shown in FIG. 1, a frame 102 includes a first or front chassis portion 104 and a second or rear chassis portion 106 that are coupled via a central chassis portion 108. In this example, the front chassis portion 104 is substantially similar to the rear chassis portion 106 and, thus, the apparatus 100 is symmetrical across a transverse axis 202 (FIG. 2) of the apparatus 100.

While the apparatus 100 may include different top interfaces, in this example, and as shown in FIGS. 1 and 2, the apparatus 100 includes a hook and pull system 110 that can be used to move a grain cart, container, cart and/or commodity tank relative to the apparatus 100. The hook and pull system 110 includes first, second and third portions 111, 112, 114. The second portion 112 is positioned between and pivotably coupled to the first and third portions 111, 114. Hydraulic cylinders and/or actuators 212, 214, 216 are coupled to the second and third portions 111, 112 and, in operation, are used to move the first, second and/or third portions 111-114. In this example, the hydraulic cylinders 212 and 214 are coupled to the second portion 112 and lift devises or apertures 218, 220 of a steer horn, tank receiver, guide and/or frame 222 and the hydraulic cylinder 216 is coupled to the second and third portions 112, 114. In this example, the apparatus 100 includes a first or front three-point hitch 118 and a second or rear three-point hitch 120. While the apparatus 100 is depicted as including two three-point hitches 118, 120, the apparatus 100 may include a different number (e.g., 0, 1) of three-point hitches.

In this example, as shown in FIG. 2, a front axle 204 is coupled to the front chassis portion 104, a rear axle 206 is coupled to the rear chassis portion 106 and an engine cradle 208 is coupled to the front, central and/or rear chassis portions 104, 106, 108. One or more of the axles 204 and/or 206 may be an oscillating axle or a fixed axle. In some examples, the axles 204 and 206 are substantially similar or the same.

Figure 4:
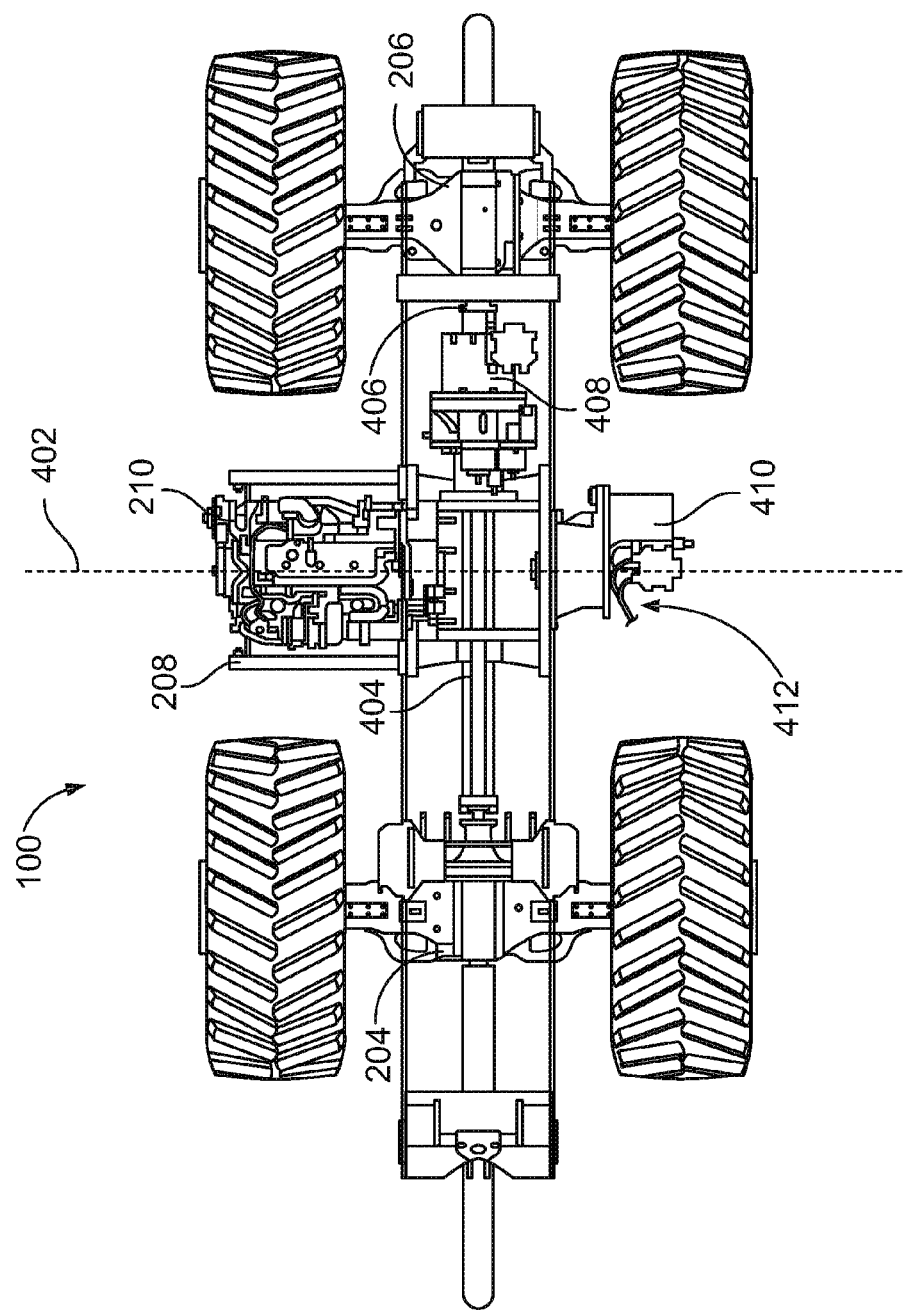
FIG. 4 depicts a plan view of the example apparatus of FIG. 1 with a portion of a top interface removed.

In this example, the engine cradle 208 is positioned between the front and rear axles 204, 206 and includes a longitudinal axis 402 (FIG. 4) that is substantially parallel to the axles 204, 206. An engine 210 is coupled to the engine cradle 208 and is centrally positioned between the front and rear axles 204, 206. Referring to FIG. 4, a first drive axle 404 couples the engine 210 to the front axle 204 and a second drive axle 406 couples the rear axle 206 to the engine 210. In some examples, a gear box 408 is positioned between the second drive axle 406 and the engine 210 and a generator 410 is coupled to the engine 210 to generate electrical power. Additionally, the apparatus 100 may include an electric drivetrain 412. In contrast to some of the illustrated examples, FIGS. 4 and 6 illustrate the apparatus 100 not being symmetric across the longitudinal axis 402.

Figure 5:
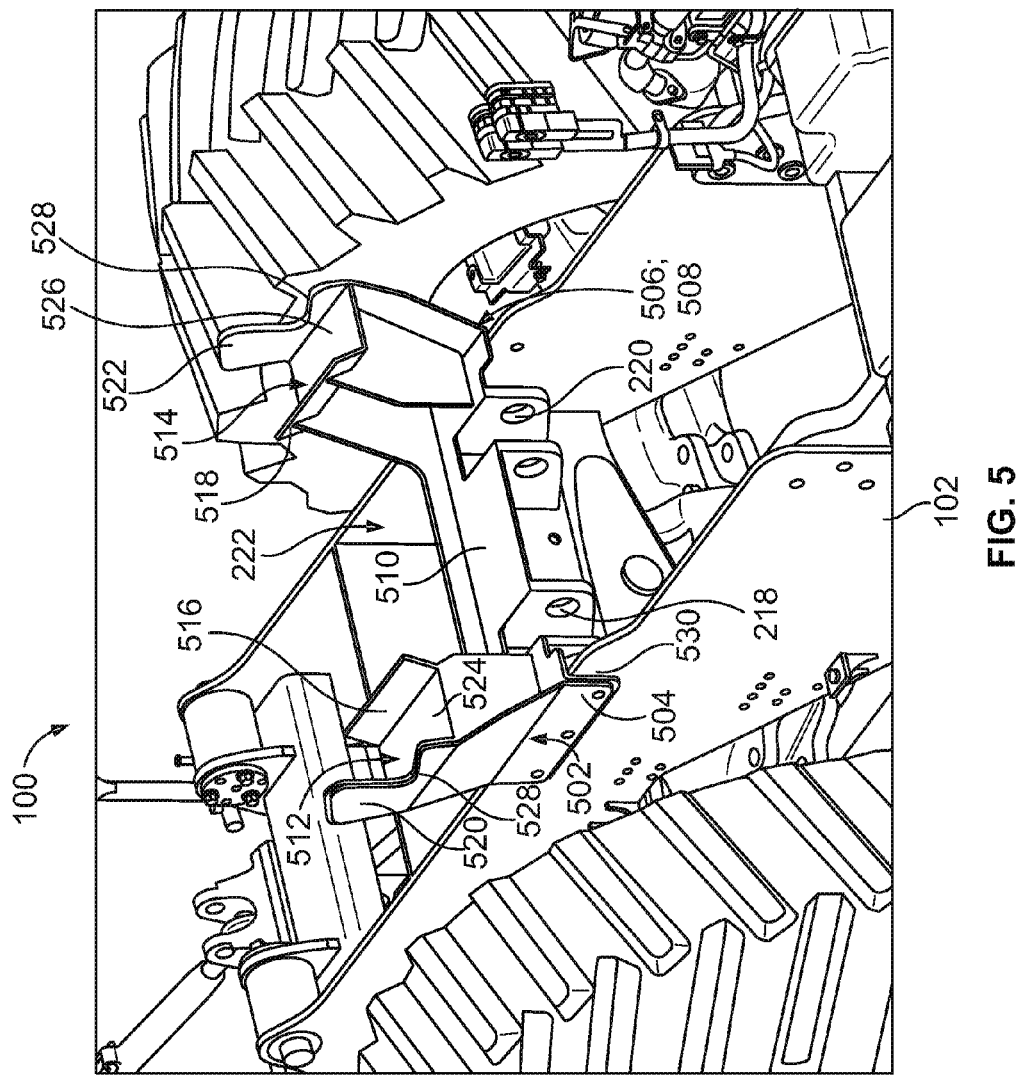
FIG. 5 depicts a detailed view of an example tank receiver of an example apparatus in accordance with the teachings of this disclosure.

As described below, to enable the smooth transition of a commodity tank onto the apparatus 100 and/or to guide the commodity tank onto or off of the apparatus 100, the first portion 111 include guides and/or wheels 116 and/or the apparatus 100 includes the tank receiver 222. Referring to FIG. 5, to secure the commodity tank relative to the apparatus 100, the tank receiver 222 includes a first interface or post 502 adjacent a first side 504 of the tank receiver 222 and a second interface or post 506 adjacent a second side 508 of the tank receiver 222. Each of the first and second interfaces 502 and 506 extend from a central portion 510 that couples the first and second interfaces 502 and 506 together.

In this example, the interfaces 502 and 504 include upwardly facing grooves 512 and 514 that are defined by inner surfaces 516, 518 and outer surfaces 520, 522 that extend from respective landing or central surfaces 524, 526. The inner surfaces 516, 518 may be inwardly tapering surfaces and/or guides and the outer surfaces 520, 522 may be guides that include a cut-out portion or notch 528 that receives a portion of the commodity tank and/or assists in guiding or securing the commodity tank relative to the apparatus 100. To couple the tank receiver 222 to the frame 102, the frame 102 defines one or more downwardly facing grooves 530 that receive the frame 102 and/or position the tank receiver 222 to be coupled to the frame 102 using fasteners (e.g., bolts, rivets, etc.). The tank receiver 222 may be manufactured and/or produced in different ways. For examples, the tank receiver 222 may include multiple pieces coupled together and/or may be a single casted part.

Figure 6:
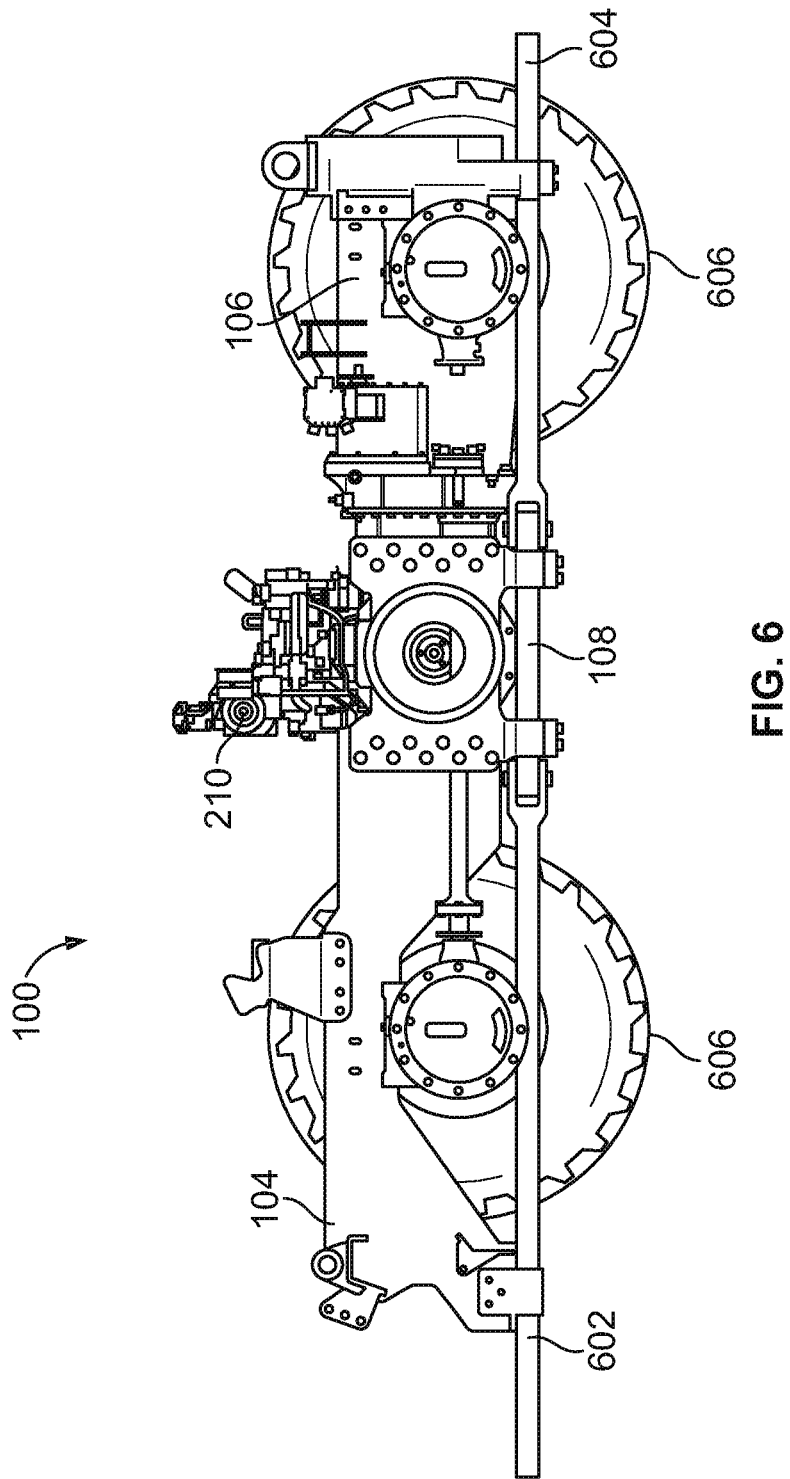
FIG. 6 depicts an elevational view of the example apparatus of FIG. 3 with a portion of a top interface removed.

FIG. 6 depicts the pivotable coupling between a front or first draw bar 602 and the central chassis portion 108 and between a rear or second draw bar 604 and the central chassis portion 108. While the apparatus 100 is depicted as including two pivotably coupled draw bars 602, 604, the apparatus 100 may include a different number of and/or fixed drawbars.

In some examples, the first draw bar 602 is coupled to a lead tractor and the second draw bar 604 is coupled to an implement (e.g., a seeder). In operation, the force from the tractor is transferred through the first draw bar 602, the central chassis portion 108 and the second draw bar 604 without such force being transferred to the front and/or rear chassis portions 104, 106. Thus, in some such examples, the front and rear chassis portions 104, 106 are configured to handle less force being transmitted therethrough than the drawbars 602, 604. For example, the draw bars 104, 106 and the central chassis portion 108 can be configured such that a majority of the power from the lead tractor (e.g., 700 horsepower) can be transmitted therethrough while the front and rear chassis portions 104, 106 can be configured such that less power (e.g., 300 horsepower) can be transmitted therethrough.

Additionally or alternatively, the apparatus 100 may assist the lead tractor in, for example, ascending a hill. In such examples, when the apparatus 100 assists the tractor, the engine 210 causes tires 606 to rotate and the power from rotating the tires 606 is transferred to the lead tractor via the front and/or rear chassis portions 104, 106, the central chassis portion 108 and the draw bars 602 and/or 604.

Figure 7:
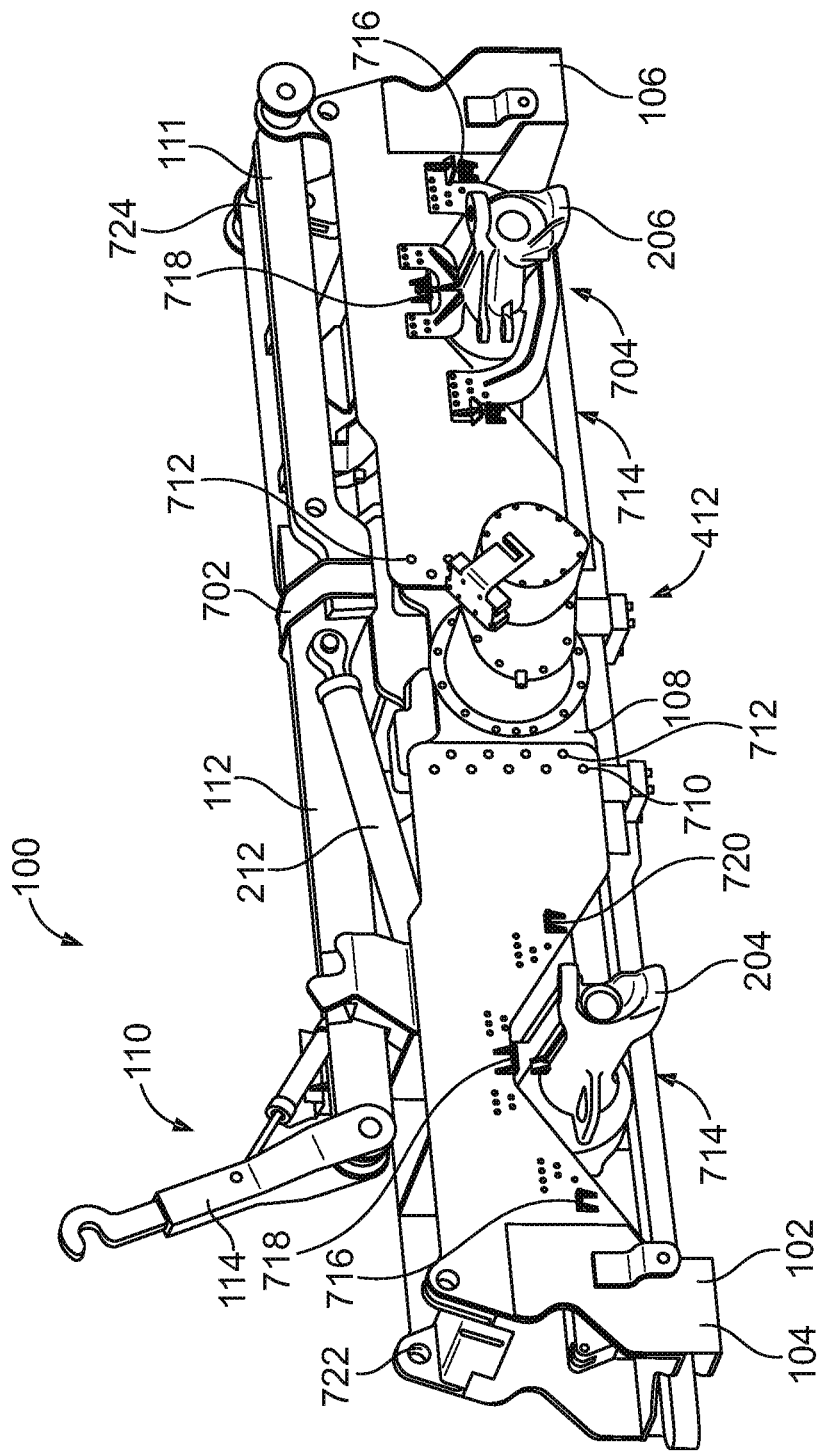
FIG. 7 depicts an example frame, axles and top interface of FIG. 1.

FIG. 7 depicts the example apparatus 100 including the frame 102 but without tires and body panels. In this example, the hook and pull system 110 includes a bracket 702 coupled to the first portion 111 that receives the second portion 112. In operation, if the apparatus 100 is dumping a load (e.g., like a dump truck), a pin or slider may be used to couple the first and second portions 111, 112 at or adjacent the bracket 702 to enable the hydraulic cylinders 212, 214 to control the movement of and/or raise the first portion 111 and, in turn, the commodity tank relative to the apparatus 100. In some examples, the front axle 204 is an oscillating axle and the rear axle 206 is a fixed axle coupled and/or fixed to the rear chassis portion 104 via an adjustable mounting assembly and/or an adjuster 704.

As shown in FIG. 7, the chassis portions 104, 106 are substantially the same. In some examples, the chassis portions 104, 106 define apertures 710 to receive fasteners 712 to couple the chassis portions 104, 106 to the central chassis portion 108. While each side of the example chassis portions 104, 106 defines nine apertures in a staggered configuration, the chassis portions 104, 106 may include any other number of apertures and/or slots through which fasteners may extend. In other examples, the chassis portions 104, 106 are not coupled to the central chassis portion 108 via fasteners. In some such examples, the chassis portions 104, 106 are coupled to the central chassis portion 108 by a weld.

Additionally or alternatively, in some examples, the chassis portions 104, 106 define cutouts 714 having a trapezoidal shape in which the respective axles 204, 206 may be at least partially positioned. In some examples, to enable either of the axles 204, 206 to be coupled to the chassis portions 104, 106, as described in greater detail below, first, second and third mounting tabs 716, 718, 720 are positioned about each of the cutouts 714. The tabs 716, 718, 720 receive and/or couple with corresponding structures of the axles 204 and/or 206.

Additionally or alternatively, the chassis portions 104, 106 define apertures 722, 724 to which the first portion 111 of the hook and pull system 110 can be coupled. Thus, in some examples, the first portion 111 of the hook and pull system 110 can be coupled to the apertures 722 of the first chassis portion 104 or the apertures 724 of the second chassis portion 706.

Figure 8:
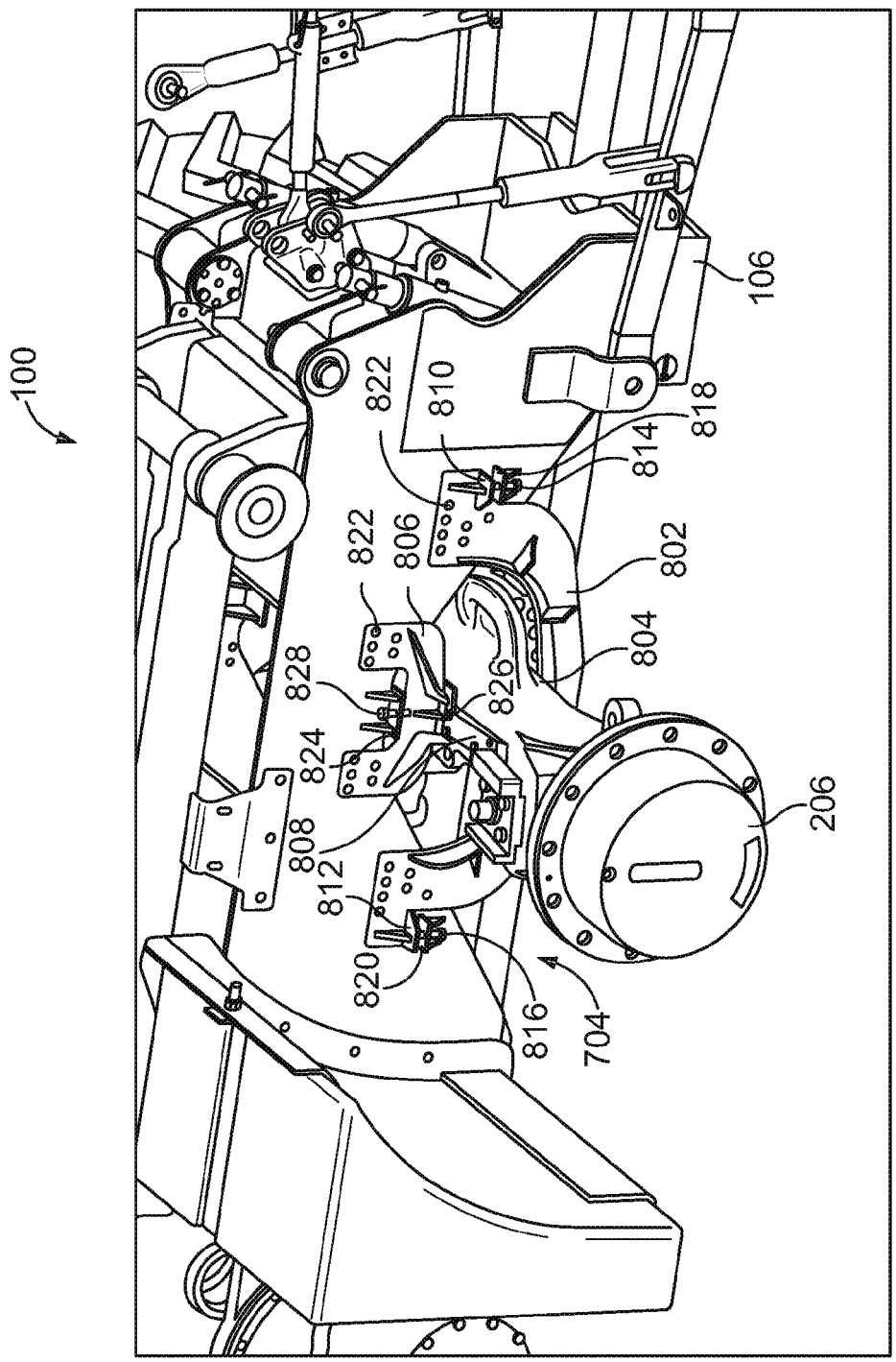
FIG. 8 depicts a detailed view of an axle and mounting assembly in accordance with the teachings of this disclosure.

FIG. 8 depicts a detailed view of the rear axle 206 and the mounting assembly 704. In this example, the mounting assembly 704 includes a first U-shaped bracket 802 adjacent a first machined and/or flat surface 804 of the rear axle 206 and a second U-shaped bracket 806 adjacent a second machined and/or flat surface 808 of the rear axle 206. To couple the rear axle 206 to the rear chassis portion 106, the first bracket 802 is positioned beneath the rear axle 206 and the rear axle 206 and the first bracket 802 are raised to position bracket tabs 810, 812 adjacent and/or above push bolts 814, 816 that extend through tabs 818, 820 of the rear chassis portion 106. The push bolts 814, 816 may be used to vertically position the first bracket 802 prior to coupling the first bracket 802 to the rear chassis portion 106 using fasteners that extend through apertures 822. In some examples, the placement of the apertures 822 enables the first bracket 802 to be vertically adjusted.

The second bracket 806 may be positioned above the rear axle 206 and between the rear axle 206 and a tab 824 that extends from the rear chassis portion 106. To couple the second bracket 806 to the rear axle 206, the second bracket 806 defines a groove 826 that receives the second machined flat surface 808 and a fastener 828 extends through the tab 824 and engages the second bracket 806. To couple the second bracket 806 to the rear chassis portion 106, fasteners may extend through the apertures 822 of the second bracket 806.

Figure 9:
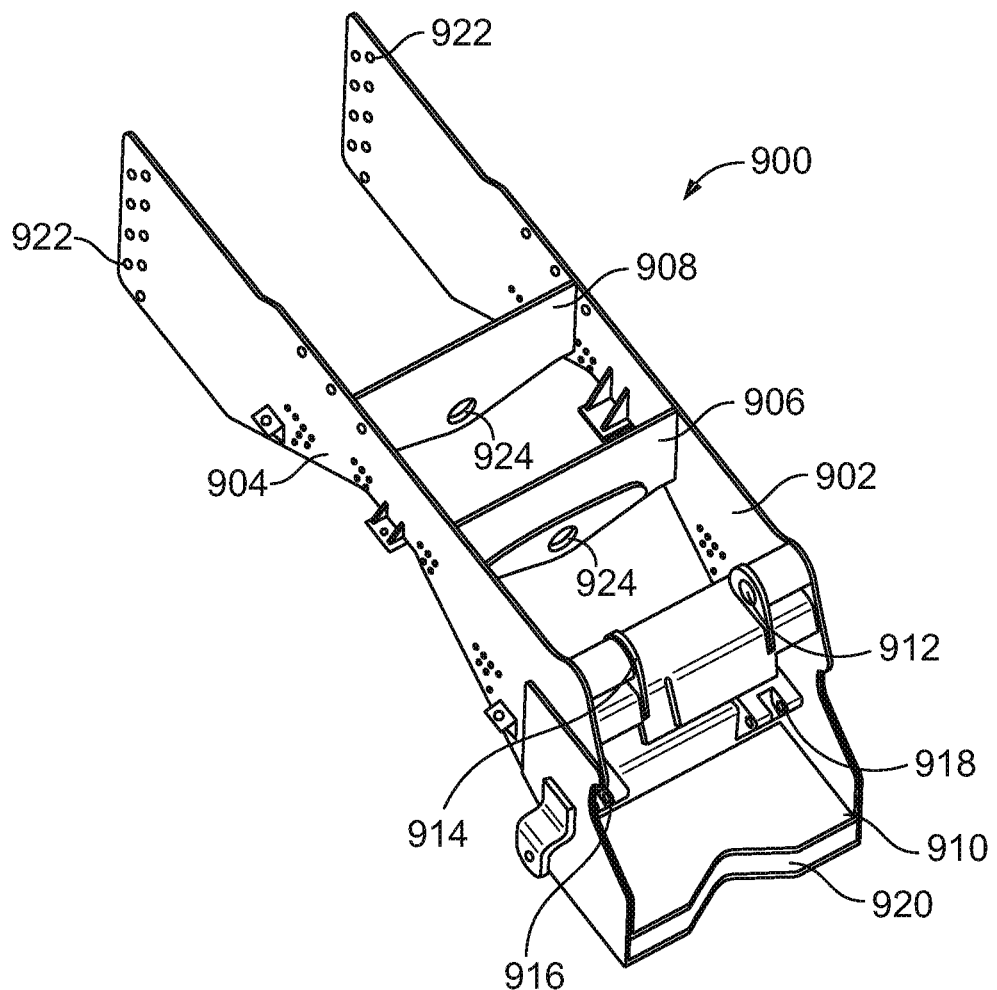
FIG. 9 depicts a perspective view of an example chassis portion in accordance with the teachings of this disclosure.
Figure 10:
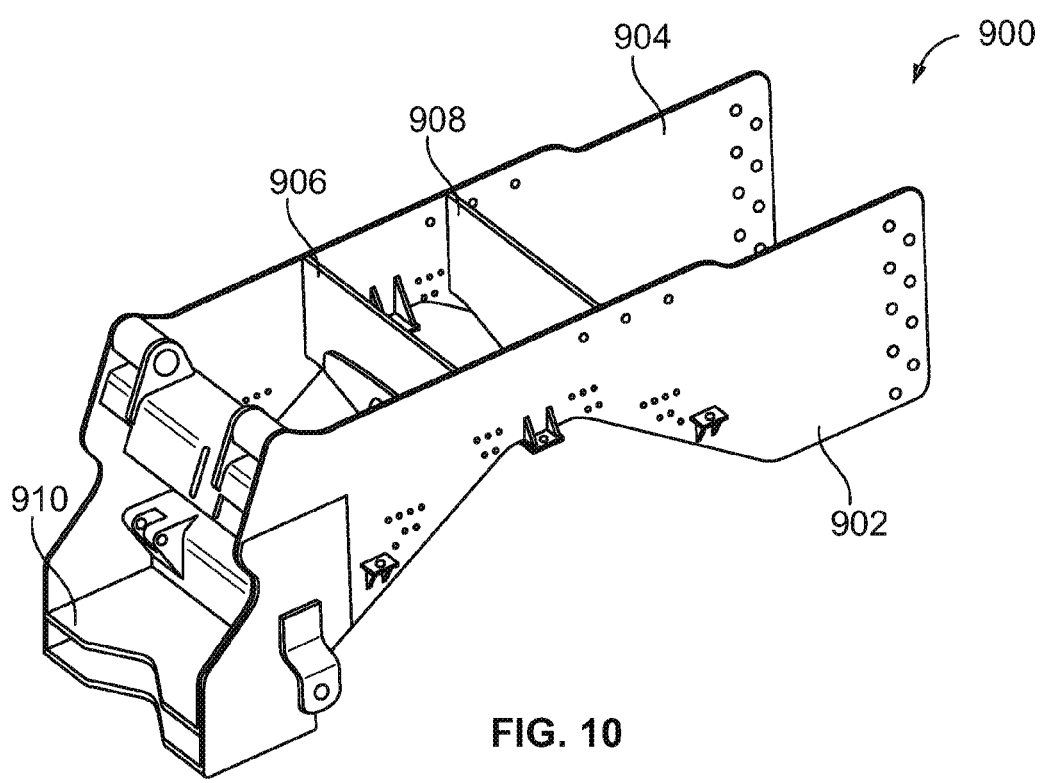
FIG. 10 depicts another perspective view of the example chassis portion of FIG. 9.
Figure 11:
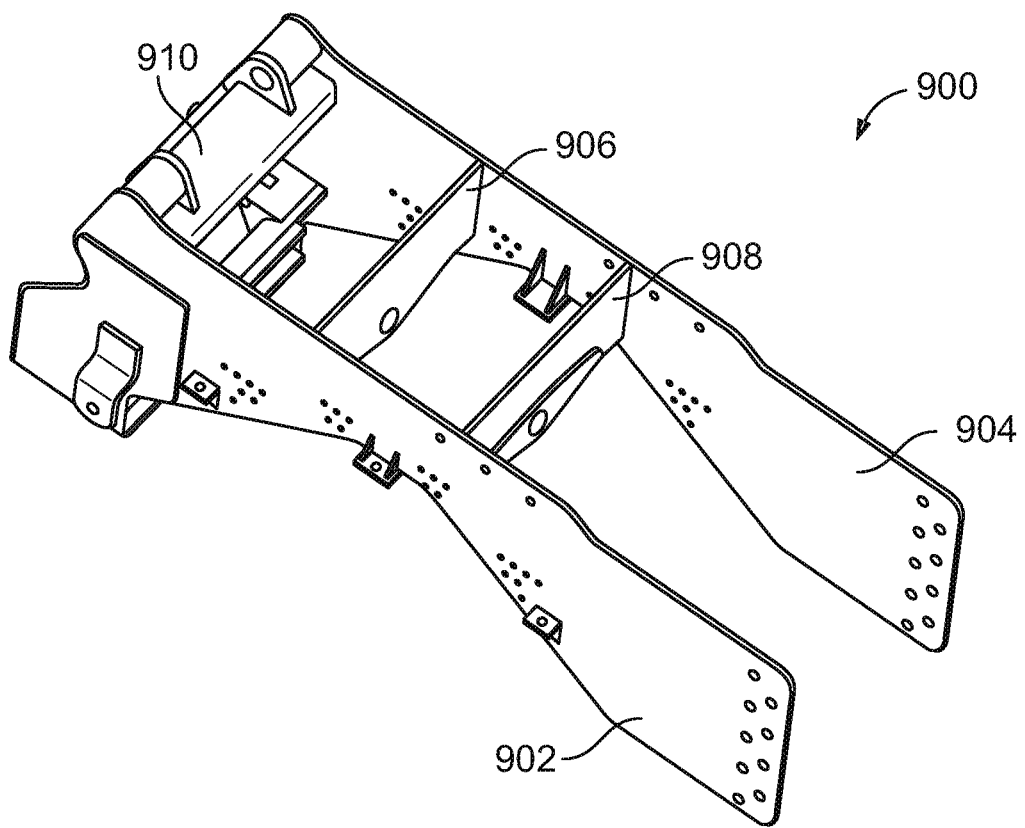
FIG. 11 depicts another perspective view of the example chassis portion of FIG. 9.

FIGS. 9-11 depict an example chassis portion 900 that can be used to implement the examples disclosed herein. For example, the chassis portion 900 may be used as a front and/or rear chassis portion. The chassis portion 900 includes a first side 902 and a second side 904 that are coupled together by first, second and third spanning members 906, 908 and 910. In some examples, the first and second sides 902, 904 are substantially similar or the same. In some examples, the first and second spanning members 906, 908 are substantially similar or the same. As used herein, the phrase "substantially similar or the same" accounts for manufacturing tolerances and/or other minor variations between the parts. Thus, in some examples, except for manufacturing tolerances, the first side 902 is the same as and/or a mirror image of the second side 904 and the first spanning member 906 is the same as and/or a mirror image of the second spanning member 908. The sides 902, 904 and/or the spanning members 906, 908 and 910 include a plurality of apertures and/or devises 912-924 that enable attachments to be coupled to the chassis portion 900, to enable chassis portions to be coupled together via fasteners and/or different structures (e.g., draw bar, drive axles) to extend therethrough. The chassis portion 900 may have different lengths, dimensions, etc. for different applications, operations, etc.

Figure 12:
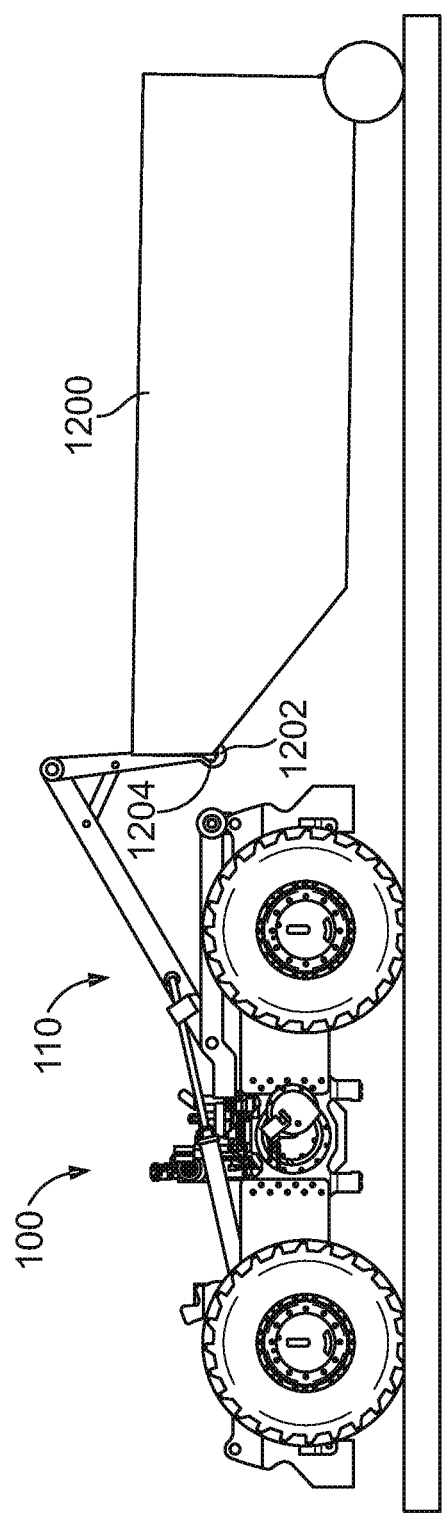
FIGS. 12-18 depict elevational views of the example apparatus of FIG. 1 performing functions with an example commodity cart in accordance with the teachings of this disclosure.
Figure 13:
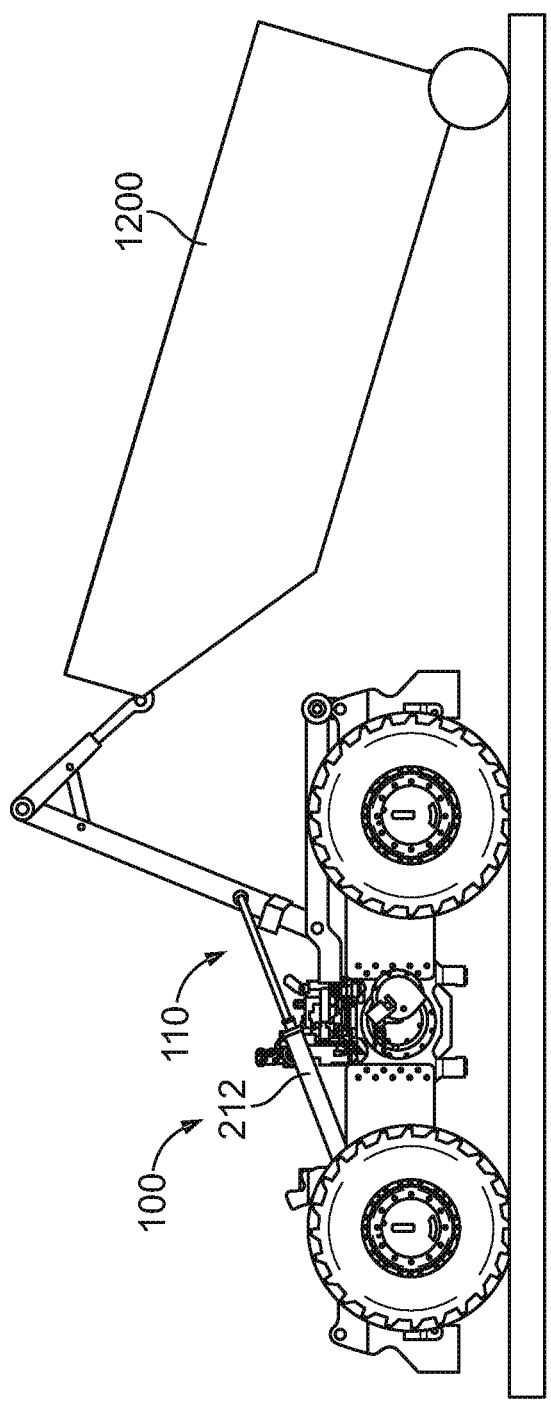
Figure 14:
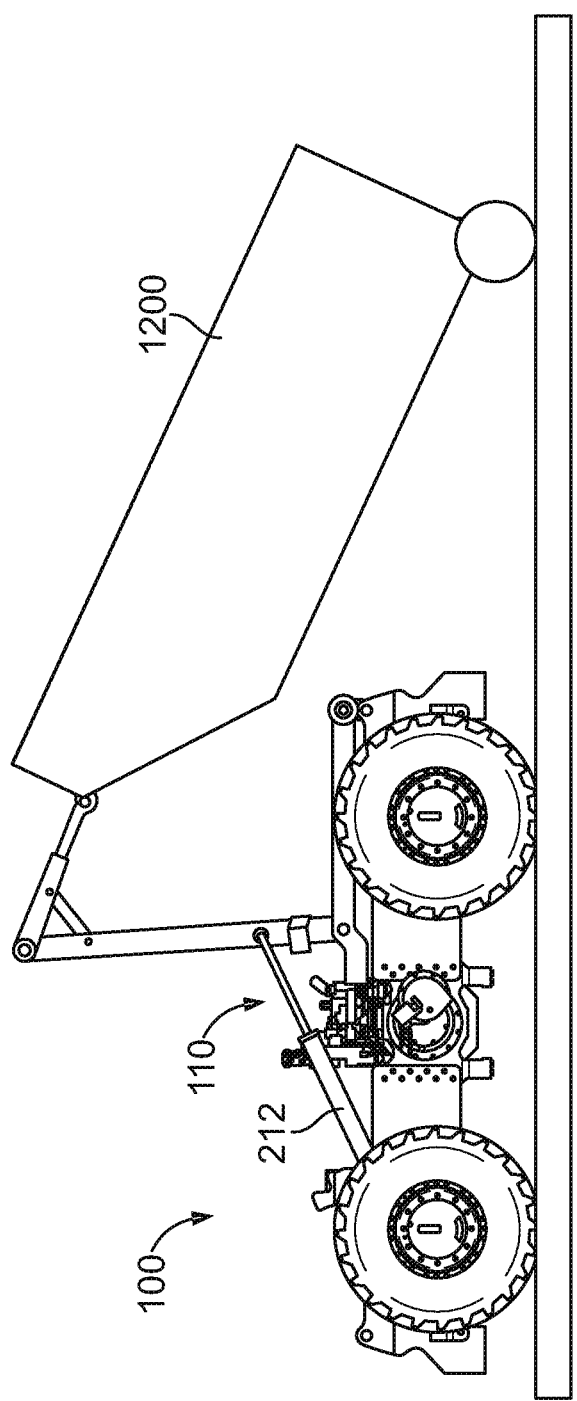
Figure 15:
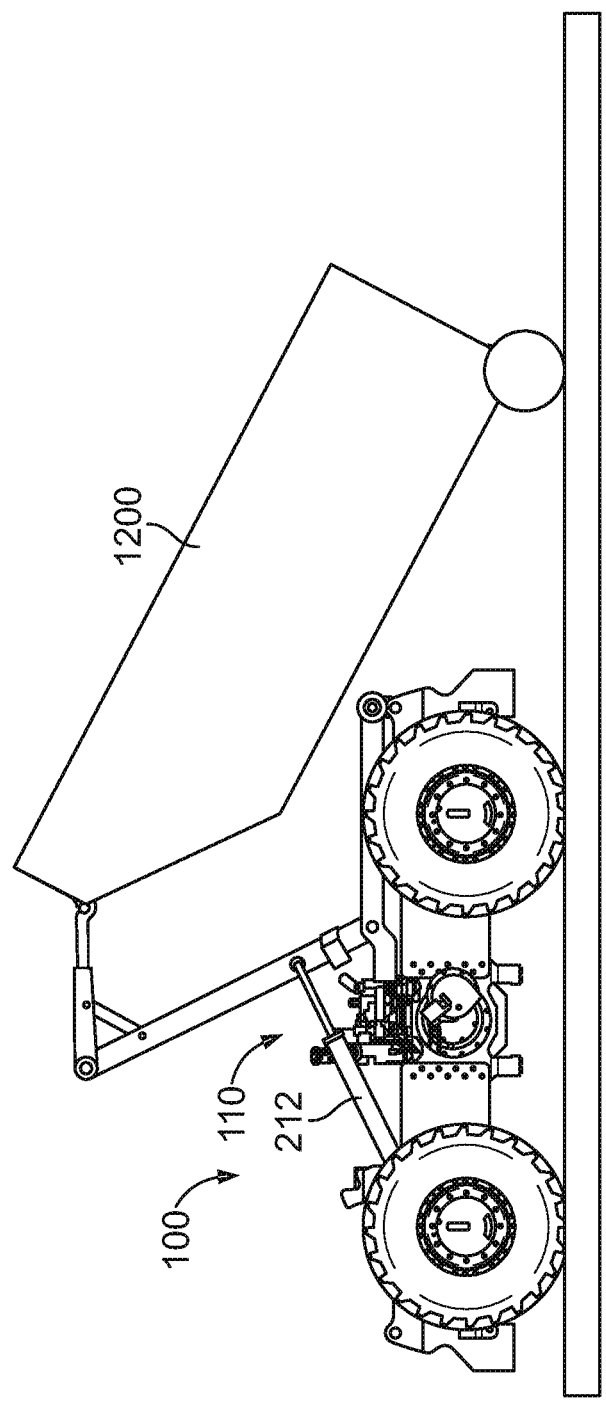
Figure 16:
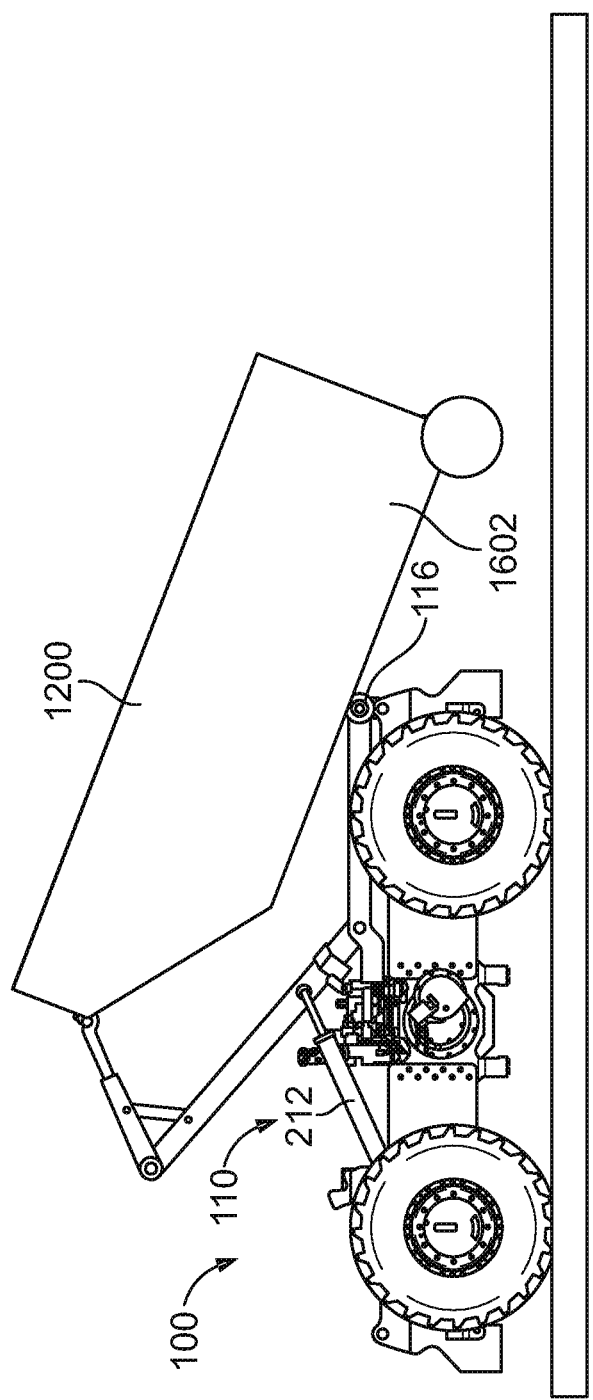
Figure 17:
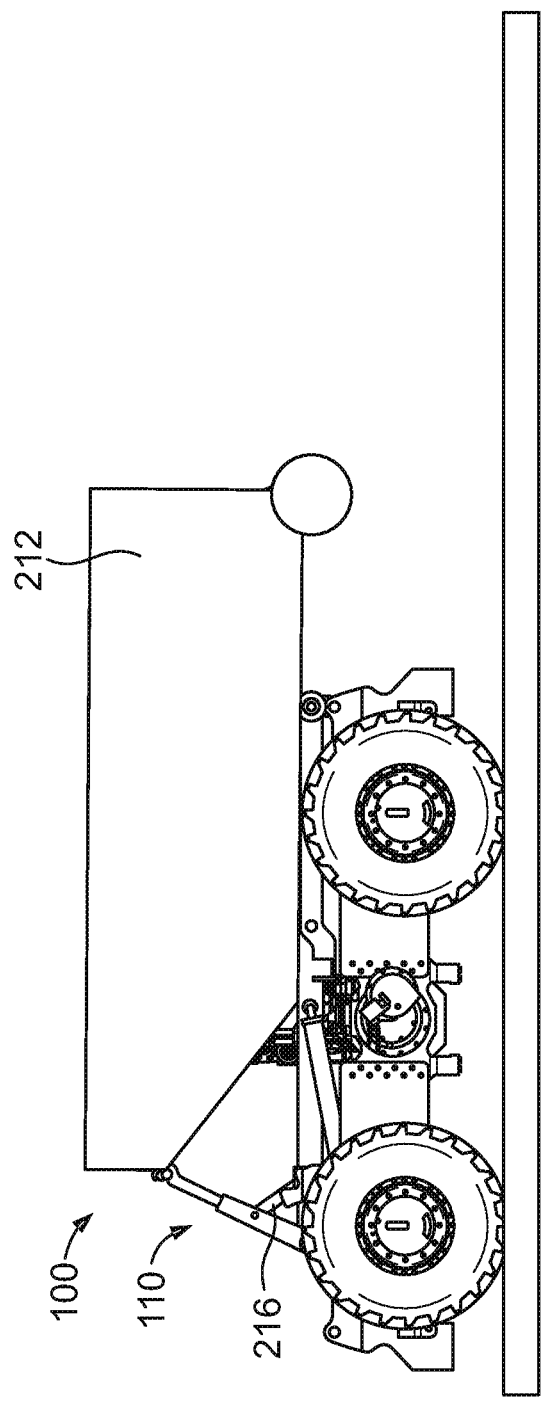
Figure 18:
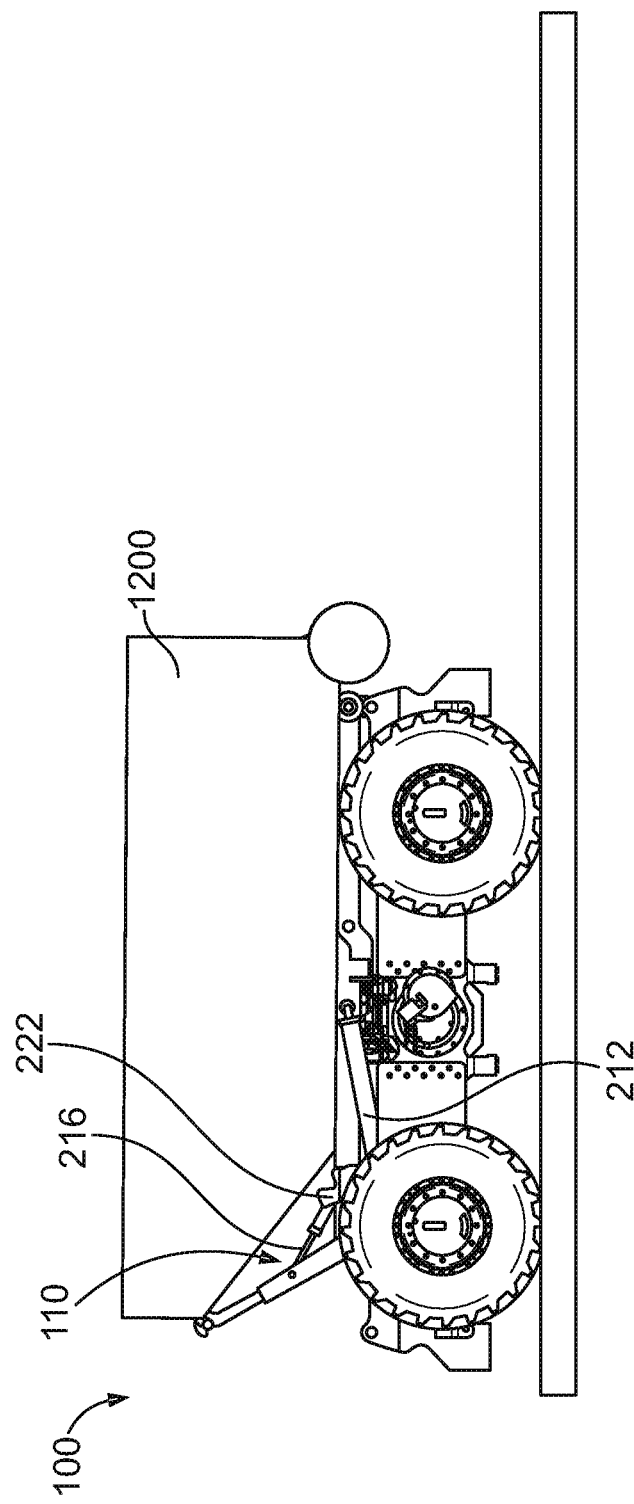

FIGS. 12-18 depict an example commodity cart 1200 being pulled on to the top of the apparatus 100, which is shown without body panels. FIG. 12 depicts a hook 1202 of the hook and pull system 110 engaging a bar or area 1204 of the commodity cart 1200. FIGS. 13-16 depict the hook and pull system 110 pulling the commodity cart 1200 onto the apparatus 100 by retracting the hydraulic cylinders 212, 214. FIG. 16 depicts the wheels 116 being engaged by and/or interacting with a bottom portion 1602 of the commodity cart 1200 to assist in moving the commodity cart 1200 on top of the apparatus 100. FIGS. 17 and 18 depict the commodity cart 1200 on top of the apparatus 100 and the hook and pull system 110 moving the commodity cart 1200 toward the front of the apparatus 100 by extending the hydraulic cylinder 216. In the secured position, the commodity cart 1200 may be received by the grooves 512, 514 of the tank receiver 222.

Figure 19A:
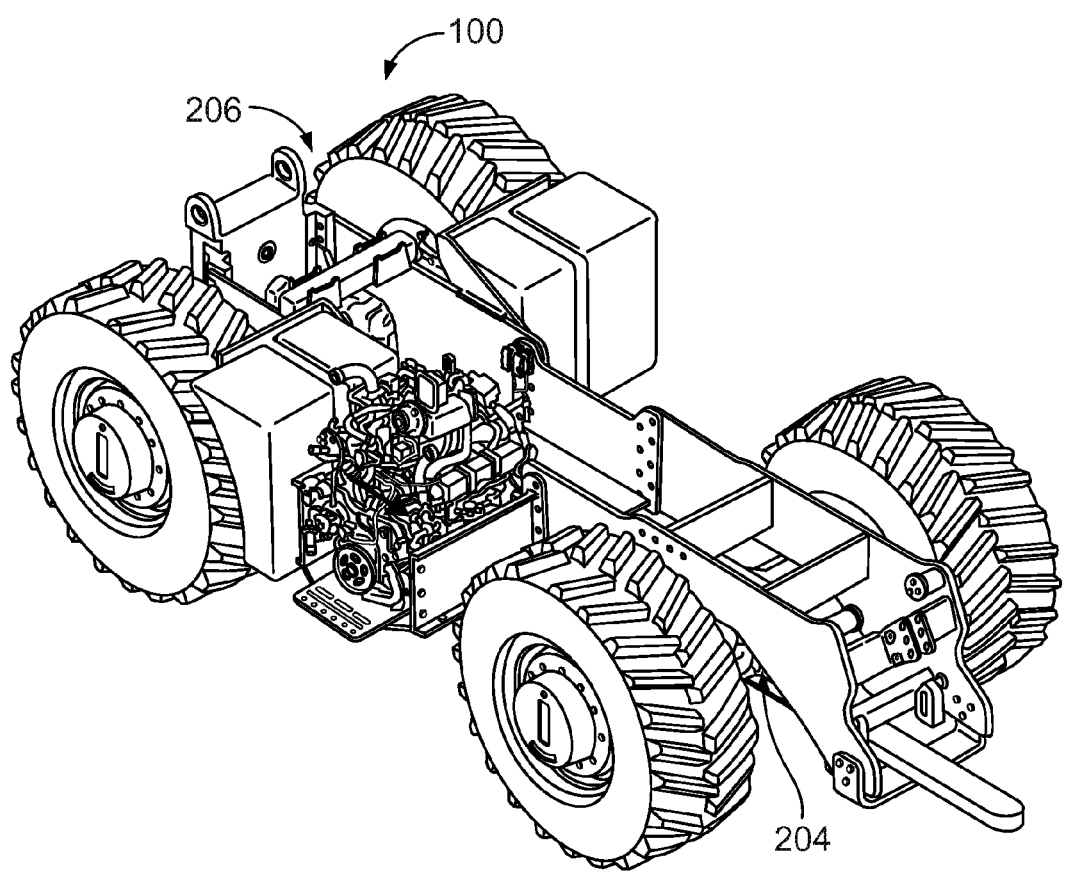
FIGS. 19A, 19B and 19C depict different views in which an engine can be positioned in an example apparatus in accordance with the teachings of this disclosure.
Figure 19B:
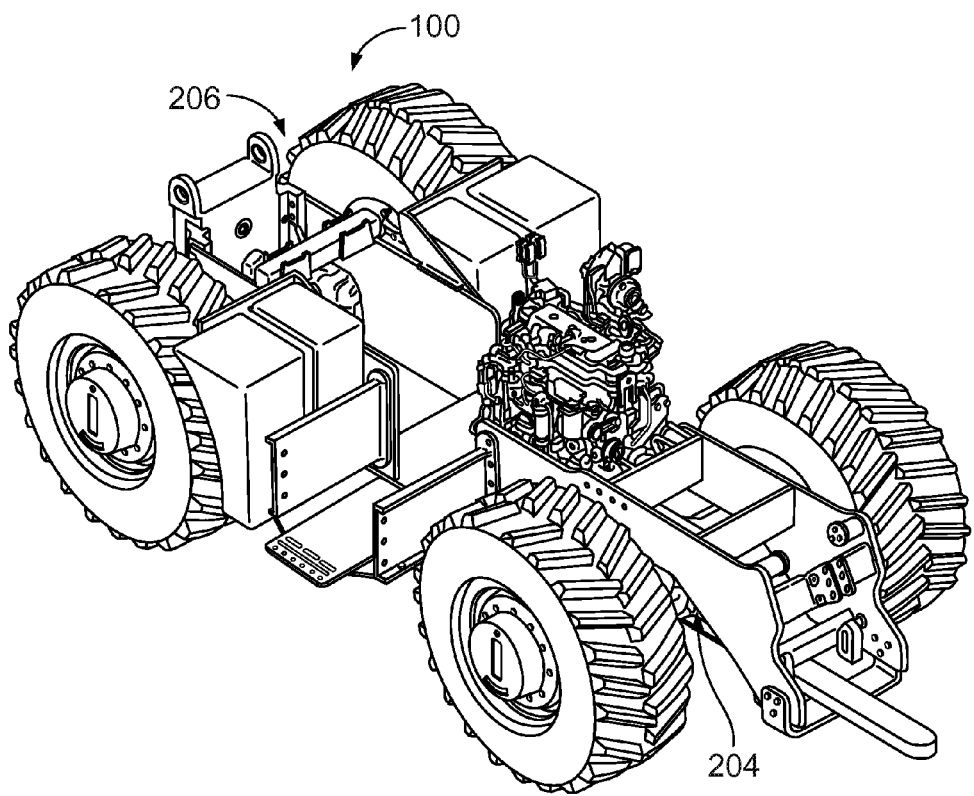
Figure 19C:
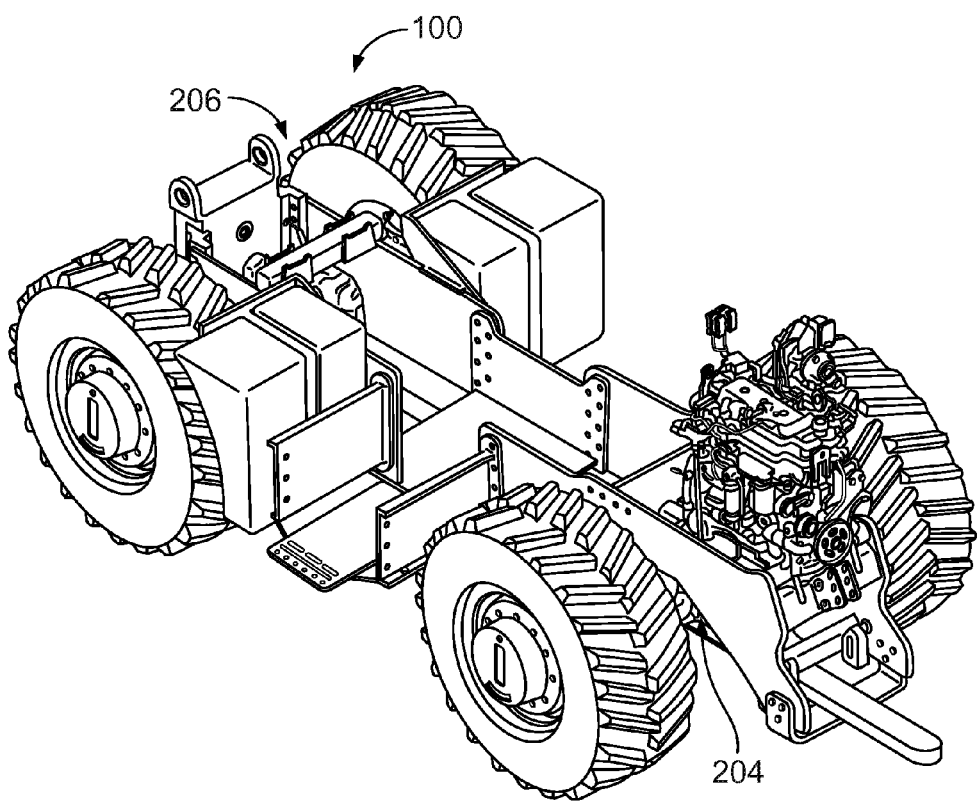

FIGS. 19A, 19B and 19C depict different positions that the engine 210 may be placed. For example, FIG. 19A shows that the engine 210 may be positioned in a first position "A", FIG. 19B shows that the engine 210 may be positioned in a second position "B", and FIG. 19C shows that the engine 210 may be positioned in a third position "C." In the first position, "A", the engine 210 is between the axles 204, 206 and a longitudinal axis of the engine 210 is parallel to the axles 204, 206. In the second position, "B", the engine 210 is between the axles 204, 206 and a longitudinal axis of the engine 210 is perpendicular to the axles 204, 206. In the third position, "C", the engine 210 is on top of the the axle 204 and a longitudinal axis of the engine 210 is perpendicular to the axles 204, 206.

Figure 20:
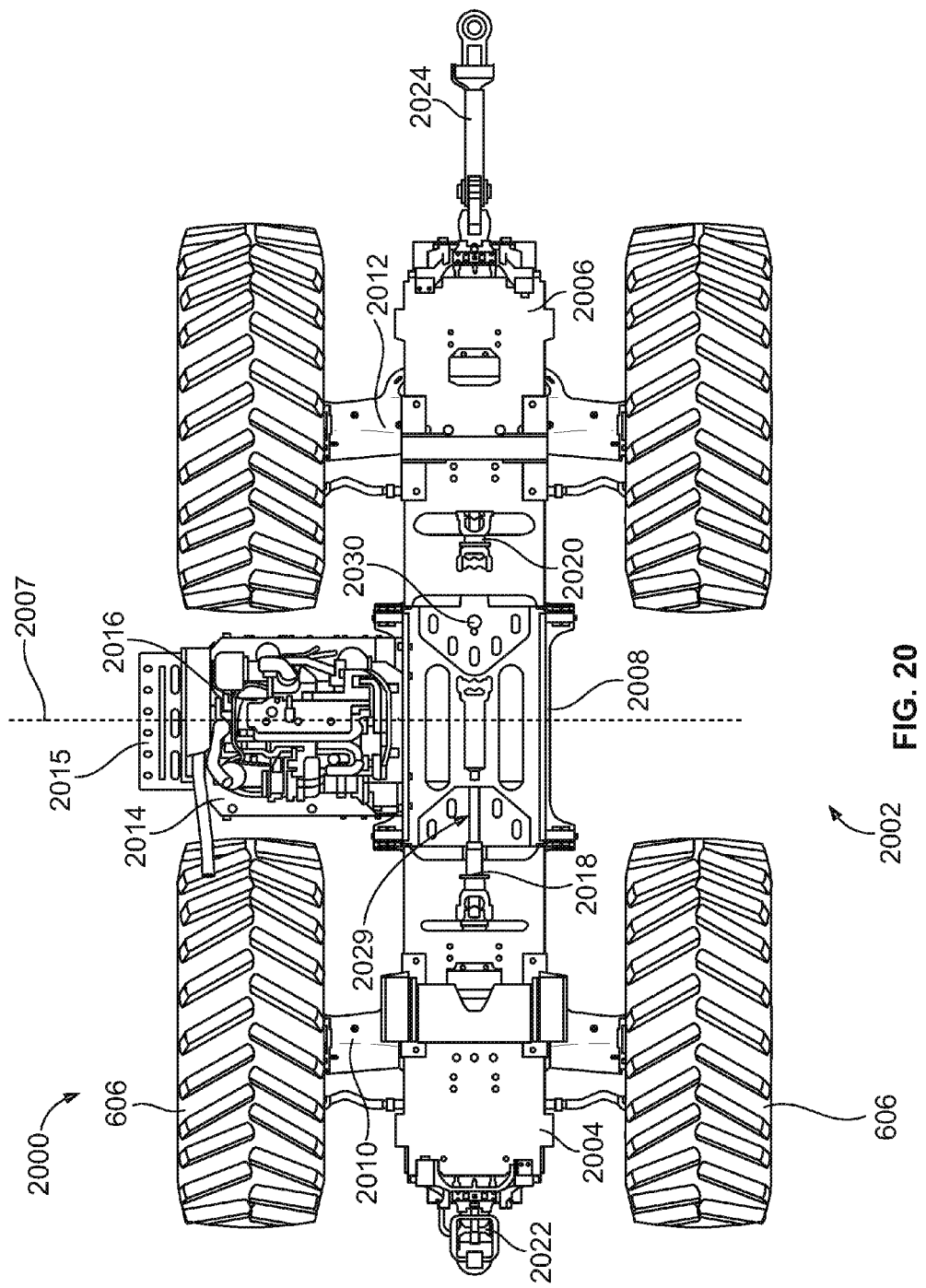
FIGS. 20-26 depict different views of an example apparatus in accordance with the teachings of this disclosure.
Figure 21:
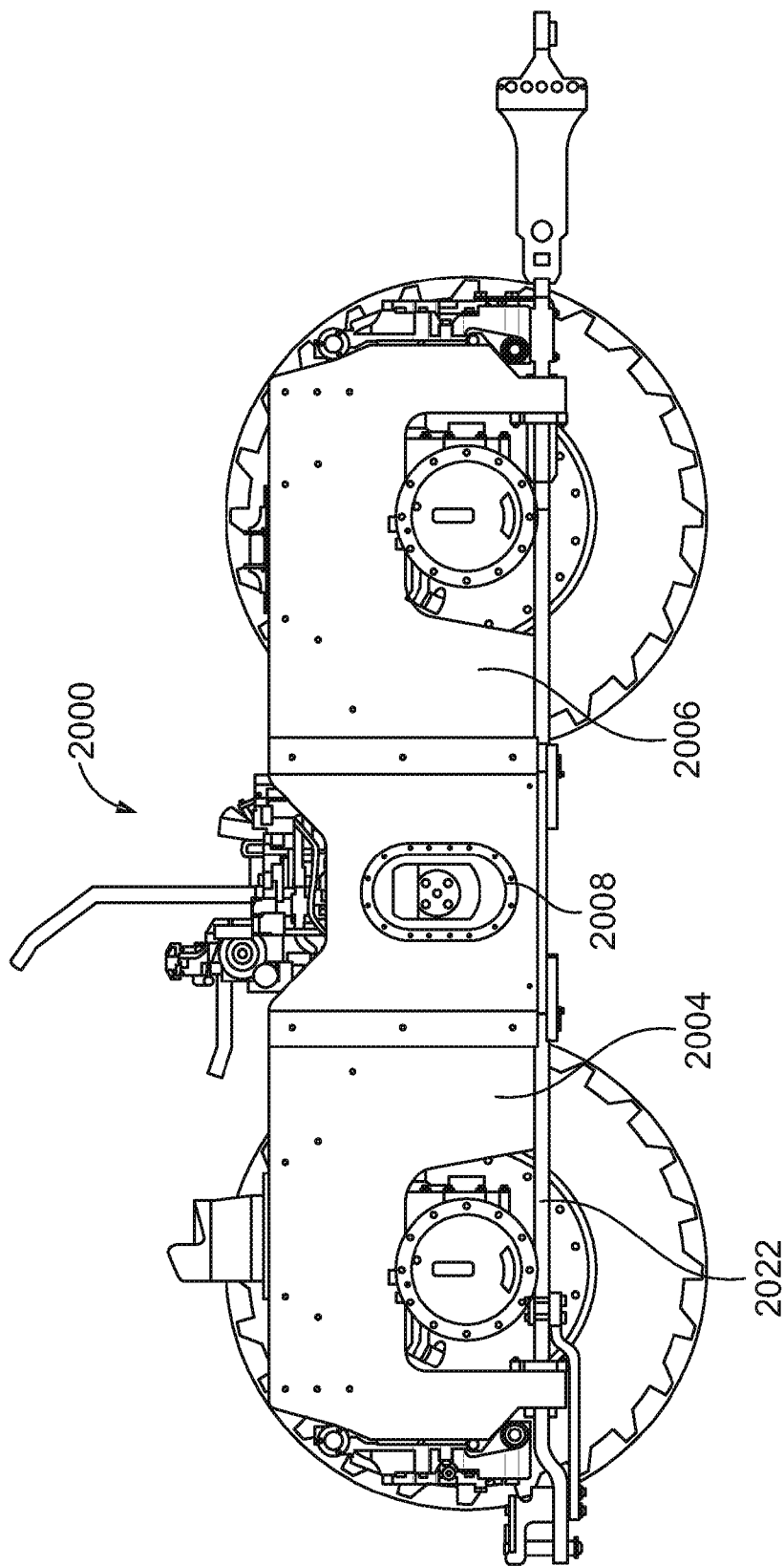
Figure 22:
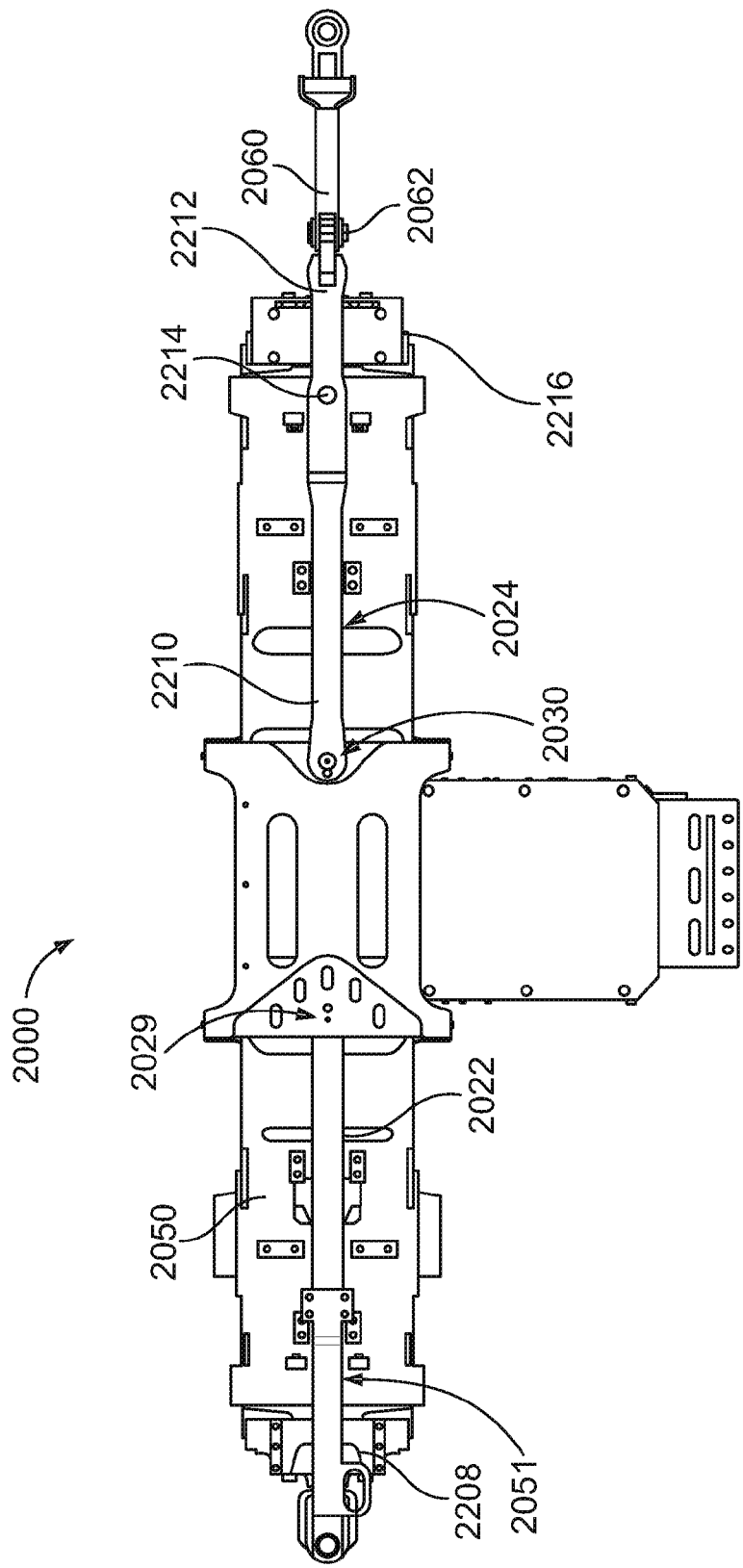

FIGS. 20-22 depict different views of an example apparatus, vehicle, modular power unit and/or self-powered machine 2000 in accordance with the teachings of this disclosure. The apparatus 2000 has a frame 2002 including a first or rear chassis portion 2004 and a second or front chassis portion 2006 that are coupled via a central chassis portion and/or drive train frame 2008. In this example, the rear chassis portion 2004 is substantially similar to the front chassis portion 2006 and, thus, the apparatus 2100 is symmetrical across a transverse axis 2007 of the apparatus 2000.

In this example, a rear axle 2010 is coupled to the rear chassis portion 2004, a front axle 2012 is coupled to the front chassis portion 2006 and an engine cradle 2014 having service steps 2015 is coupled to the front, central and/or rear chassis portions 2004, 2006, 2008. One or more of the axles 2010 and/or 2012 may be an oscillating axle or a fixed axle. In some examples, the axles 2010 and 2012 are substantially similar or the same.

In this example, the engine cradle 2014 is positioned between the front and rear axles 2010, 2012 and includes a longitudinal axis that is substantially parallel to the axles 2010, 2012. An engine 2016 is coupled to the engine cradle 2014 and is centrally positioned between the front and rear axles 2010, 2012. A first drive axle 2018 couples the engine 2016 to the rear axle 2010 and a second drive axle 2020 couples the front axle 2012 to the engine 2016.

Figure 23:
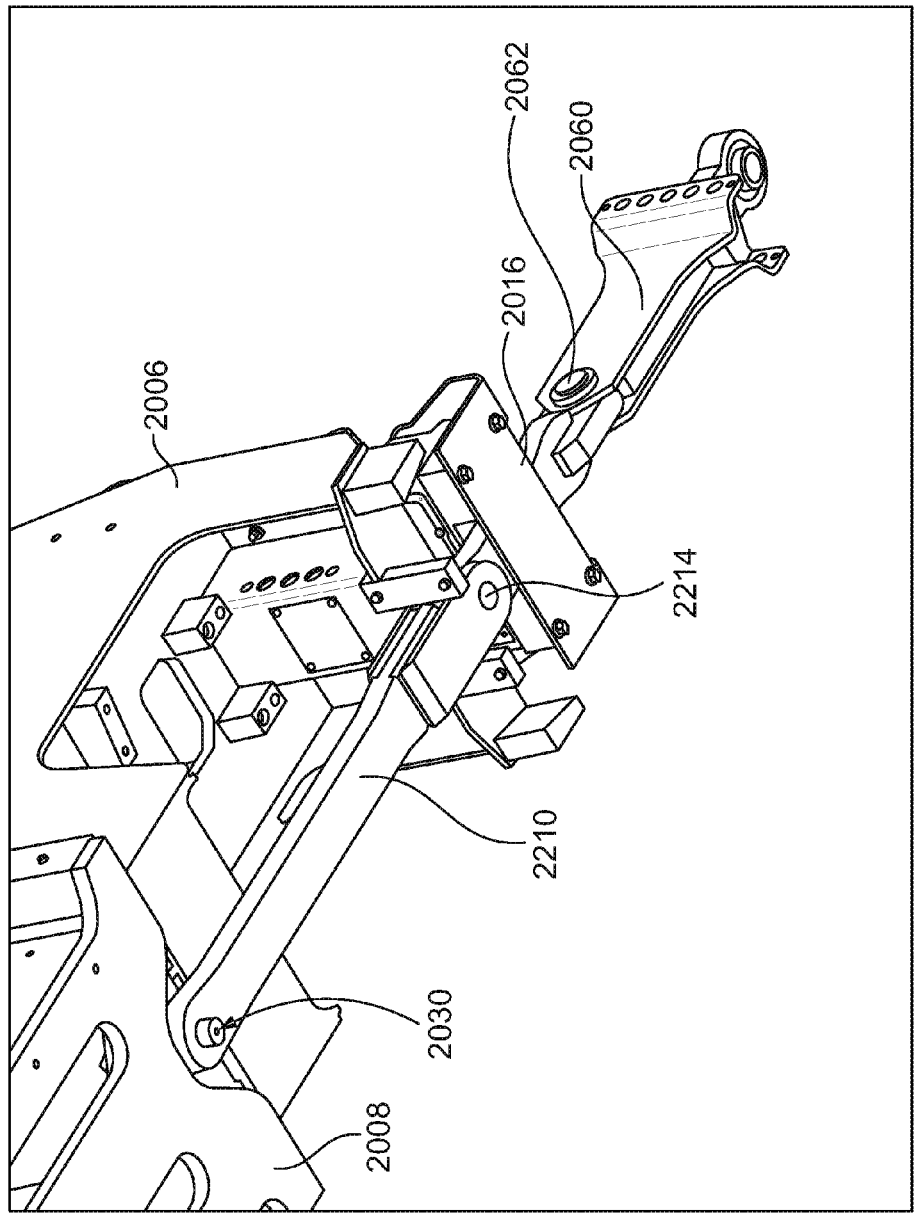
Figure 24:
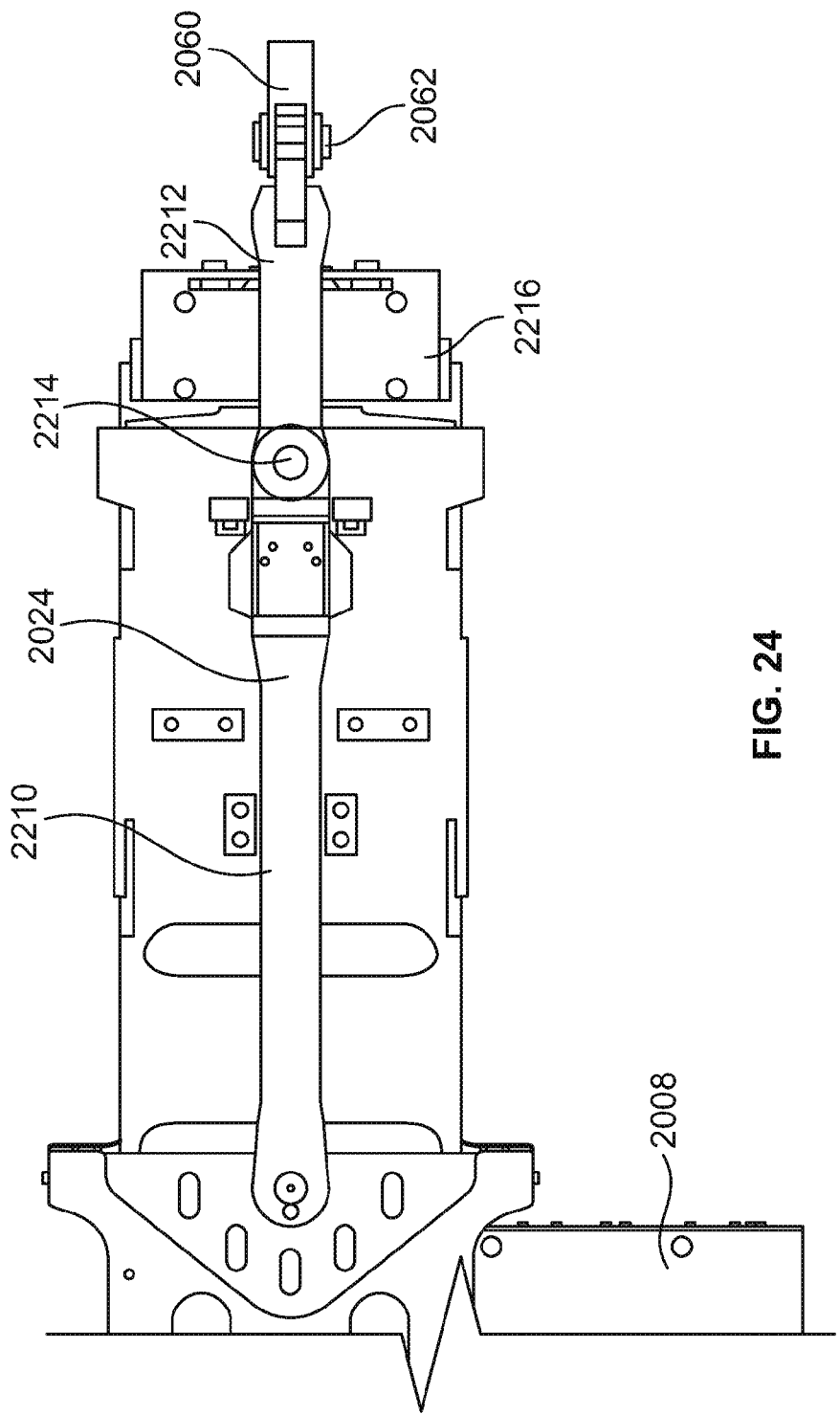
Figure 25:
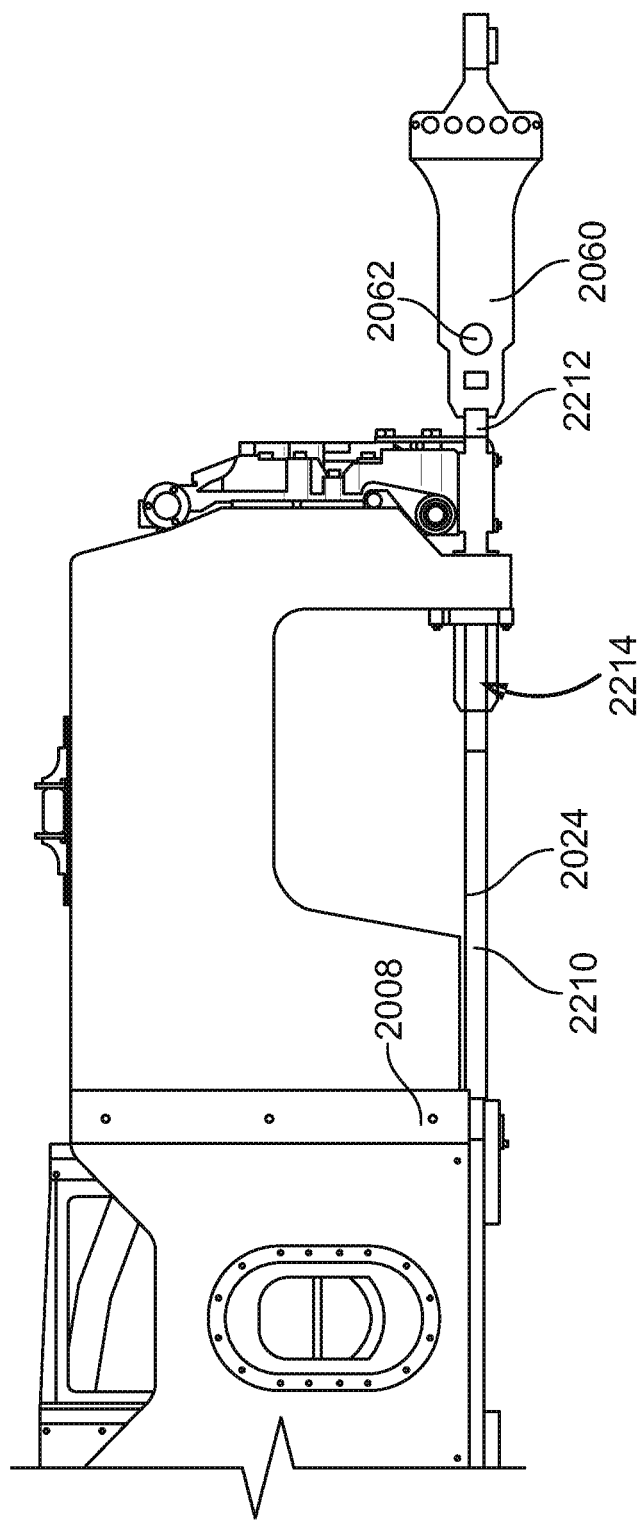
Figure 26:
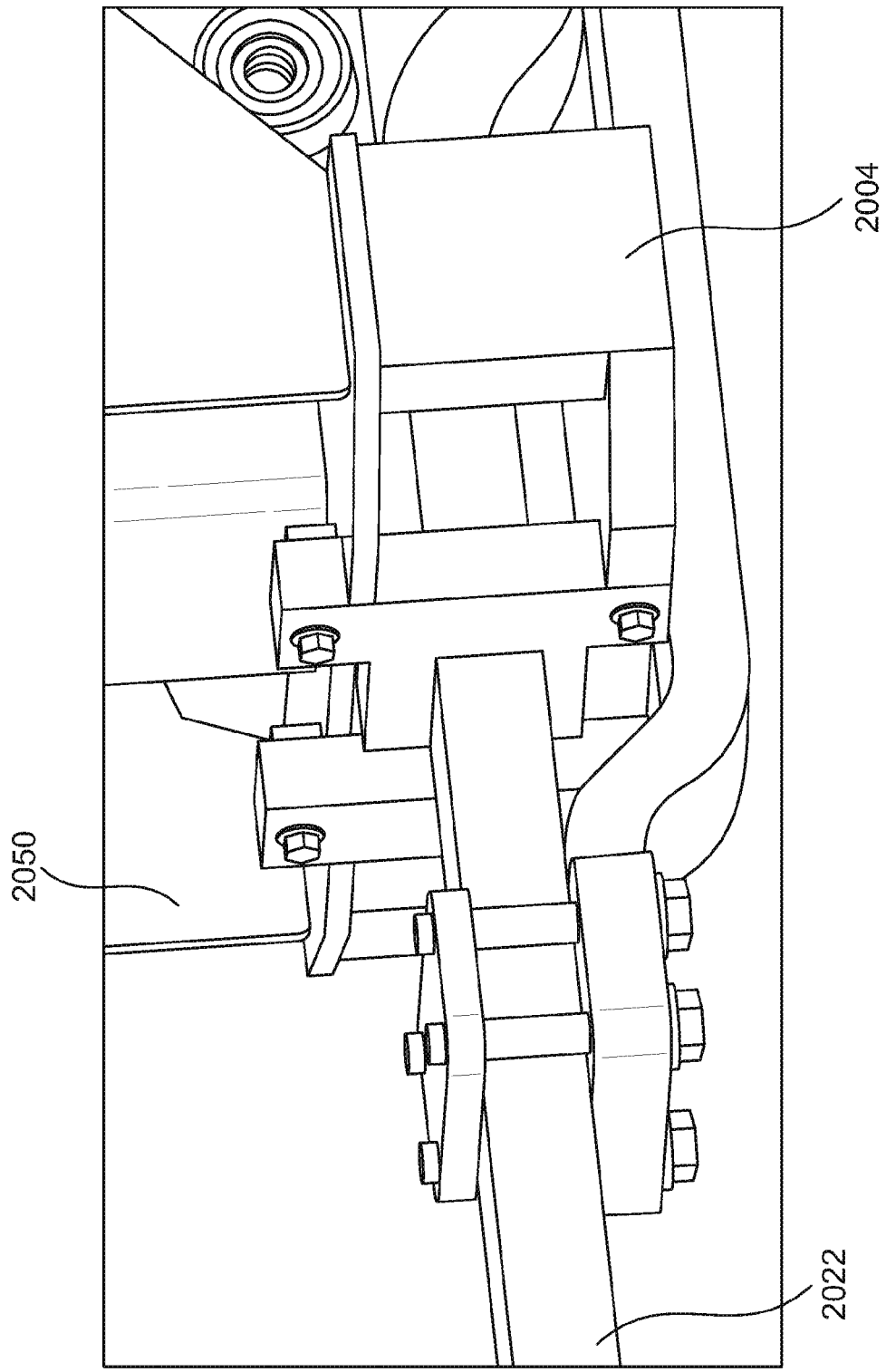

In some examples, to enable power to be transferred from a lead tractor through the apparatus 2000 to an implement, the apparatus 2000 includes a rear and/or first draw bar 2022 and a front and/or second draw bar 2024 both of which are coupled on opposing sides of the central chassis portion 2008 at respective couplings 2029, 2030. Referring to FIG. 22, a partial plan view of the apparatus 2000 is shown detailing the first and second draw bars 2022, 2024. In some examples, the first drawbar 2022 extends through a rear frame segment 2050 and/or a rear drawbar support bracket 2051. In some examples, the first drawbar 2022 is a heavy duty rear drawbar segment and/or a fixed drawbar that extends through a 3-point hitch casting, cart pivot casting and/or end 2208 of the apparatus 2000. In some examples, the second drawbar 2024 extends includes a drawbar connecting segment, a first and/or fixed portion 2210, a lateral swing drawbar, second and/or pivotable portion 2212 and a vertical pivoting drawbar, third and/or pivotable portion 2060. The second portion 2212 is pivotably coupled to the fixed portion 2210 at a second pivot point 2214 and the third portion 2062 is pivotably coupled to the second portion 2212 at a third pivot point 2062. To enable movement of the second drawbar 2024 to substantially not interfere with and/or engage the tires 606 of the apparatus 2000, the pivot points 2214, 2062 are adjacent and/or proximate a second 3-point drawbar hitch, a cart pivot point, a casting and/or rear end 2216 of the apparatus 2000. In some examples, the pivot point 2214 enable lateral movement and/or the pivot point 2062 enables vertical movement. FIGS. 23-25 depict detailed views of the second drawbar 2024. FIG. 26 depicts a detailed view of the first drawbar 2022.

As disclosed herein, an example apparatus includes a front chassis portion and a rear chassis portion. The front chassis portion is to be coupled to the rear chassis portion. The front chassis portion is substantially the same as the rear chassis portion. When the front and rear chassis portions are coupled, the front chassis portion includes a first end of the apparatus and the rear chassis portion includes a second end of the apparatus. In some examples, when the front and rear chassis portions are coupled, the front chassis portion is to be opposite the rear chassis portion.

In some examples, when the front and rear chassis portions are coupled, the front chassis portion and the rear chassis portion are substantially symmetrical across a transverse axis of the apparatus. In some examples, when the front and rear chassis portions are coupled, the front chassis portion and the rear chassis portion are substantially symmetrical across a longitudinal axis of the apparatus. In some examples, the apparatus includes a modular power unit. In some examples, the apparatus includes an unmanned vehicle. In some examples, the front chassis portion includes a first side and a second side, the first side is substantially similar to the second side. In some examples, the front chassis portion includes a first spanning member and a second spanning member positioned between the first and second sides. The first and second spanning members are to couple the first side and the second side. In some examples, the first spanning member is substantially the same as the second spanning member. In some examples, the apparatus also includes a hitch coupled to the front chassis portion or the rear chassis portion. In some examples, the hitch includes a three-point hitch.

In some examples, the apparatus also includes a drawbar coupled to the front chassis portion or the rear chassis portion. In some examples, the apparatus also includes an oscillating axle coupled to the front chassis portion or the rear chassis portion. In some examples, the apparatus also includes a drive axle to couple the oscillating axle to an engine. The engine coupled to the front chassis portion or the rear chassis portion. In some examples, the apparatus also includes a fixed axle coupled to the front chassis portion or the rear chassis portion. In some examples, the apparatus also includes a drive axle to couple the fixed axle to an engine. The engine coupled to the front chassis portion or the rear chassis portion. In some examples, the apparatus also includes a bracket to couple the fixed axle to the front chassis portion or the rear chassis portion. In some examples, the bracket includes an adjuster to enable an adjustment of the fixed axle relative to the front chassis portion or the rear chassis portion.

In some examples, the apparatus also includes a portion to couple the front chassis portion and the rear chassis portion. In some examples, the apparatus also includes a casting or sheet metal. In some examples, the portion is symmetrical across a transverse axis of the portion. In some examples, the apparatus also includes a drivetrain coupled to the portion. In some examples, the drivetrain includes an electric drivetrain. In some examples, the apparatus also includes an engine. In some examples, when the front chassis portion is coupled to the rear chassis portion, the engine is positioned in a first position, a second position, or a third portion. In some examples, the apparatus also includes a bull dozer interface coupled to the front chassis portion or the rear chassis portion. In some examples, the apparatus also includes a top interface coupled to the front chassis portion or the rear chassis portion. In some examples, the apparatus also includes a hook and pull apparatus coupled to the front chassis portion or the rear chassis portion. In some examples, the apparatus also includes the hook and pull apparatus includes a hydraulic cylinder.

Another example apparatus includes a frame to be coupled to a vehicle. The frame includes a first interface on a first side of the frame. The first interface is to receive a first side portion of a container. The frame includes a second interface on a second side of the frame. The second interface is to receive a second side portion of the container. The frame includes an aperture to which an end of a hydraulic cylinder is to be coupled.

In some examples, the apparatus also includes a second aperture to which an end of a second hydraulic cylinder is to be coupled. In some examples, the aperture is adjacent the first side and the second aperture is adjacent the second side. In some examples, the first interface includes a first inwardly tapered surface and the second interface includes a second inwardly tapered surface. The inwardly tapered surfaces are to seat the container into the respective first and second interfaces.

In some examples, the frame comprises a first groove to receive a first frame portion of the vehicle. In some examples, the first groove is adjacent the first interface. In some examples, the frame includes a first portion, a second portion, and a third portion. The first portion includes the first interface and the third portion includes the second interface. In some examples, the second portion is positioned between the first portion and the third portion. In some examples, the first portion extends from the second portion and the third portion extends from the second portion. In some examples, the first portion includes a first post and the second portion includes a second post. In some examples, the first interface includes a first outer guide, a first landing surface, and a first inner guide and the second interface includes a second outer guide, a second landing surface, and a second inner guide. In some examples, the first and second inner guides include inward tapering surfaces.

Another example apparatus includes a front axle, a rear axle, a frame coupling the front axle and the rear axle and an engine cradle coupled to the frame and positioned between the front axle and the rear axle. A longitudinal axis of the engine cradle is transverse to a longitudinal axis of the frame. In some examples, the apparatus also includes an engine coupled to the engine cradle. A longitudinal axis of the engine is substantially parallel to the front axle and the rear axle. In some examples, the engine is centrally located between the front axle and the rear axle.

In some examples, the apparatus also includes a first drive axle coupling the front axle and the engine. In some examples, the apparatus also includes a second drive axle coupling the rear axle and the engine. In some examples, the apparatus also includes a gear box coupled between the engine and the first drive axle. In some examples, the apparatus also includes generator coupled to the engine to generate electricity. In some examples, the front axle or the rear axle includes an oscillating axle. In some examples, the front axle or the rear axle includes a fixed axle.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The invention claimed is:

1. An apparatus, comprising:
a front chassis portion;
a rear chassis portion, the front chassis portion to be coupled to the rear chassis portion, the front chassis portion being substantially the same as the rear chassis portion, wherein, when the front and rear chassis portions are coupled, the front chassis portion comprises a first end of the apparatus and the rear chassis portion comprises a second end of the apparatus;
an adjustable bracket; and
an axle coupled to the front chassis portion or the rear chassis portion by the adjustable bracket, the adjustable bracket movably coupled to the front chassis portion or the rear chassis portion, the axle to extend through the adjustable bracket, the adjustable bracket cradling the axle and enabling incremental adjustment of the axle with respect to the front chassis portion or the rear chassis portion.

2. The apparatus of claim 1, wherein, when the front and rear chassis portions are coupled, the front chassis portion is opposite the rear chassis portion.

3. The apparatus of claim 1, wherein, when the front and rear chassis portions are coupled, the front chassis portion and the rear chassis portion are substantially symmetrical across a transverse axis of the apparatus.

4. The apparatus of claim 1, wherein, when the front and rear chassis portions are coupled, the front chassis portion and the rear chassis portion are substantially symmetrical across a longitudinal axis of the apparatus.

5. The apparatus of claim 1, wherein the apparatus comprises a modular power unit.

6. The apparatus of claim 1, wherein the front chassis portion comprises a first side and a second side, the first side being substantially similar to the second side.

7. The apparatus of claim 6, wherein the front chassis portion comprises a first spanning member and a second spanning member positioned between the first and second sides, the first and second spanning members to couple the first side and the second side.

8. The apparatus of claim 1, further comprising a central portion to couple the front chassis portion and the rear chassis portion.

9. The apparatus of claim 8, further comprising a first draw bar and a second draw bar, wherein the first draw bar is coupled to a first pivot point of the central portion and the second draw bar is coupled to a second pivot point of the central portion, the second pivot point opposite the first pivot point.

10. The apparatus of claim 8, wherein the central portion comprises a casting or sheet metal.

11. The apparatus of claim 8, wherein the central portion is symmetrical across a transverse axis of the central portion.

12. The apparatus of claim 1, further comprising an engine.

13. The apparatus of claim 12, wherein, when the front chassis portion is coupled to the rear chassis portion, the engine is positioned in a first position, a second position, or a third position.

14. The apparatus of claim 1, wherein the incremental adjustment comprises vertical incremental adjustment.

15. The apparatus of claim 1, wherein the adjustable bracket comprises a first side and a second side, the first side movably coupled to the front chassis portion or the rear chassis portion, the second side movably coupled to the front chassis portion or the rear chassis portion, the first side independently movable relative to the second side.

16. An apparatus, comprising:
a frame coupled to a chassis of the apparatus, the frame comprising:
a first interface coupled on and extending from a first side of the chassis, the first interface comprising a first groove to receive a first side portion of a container, the first groove at least partially defined by a first inwardly tapered surface, the first inwardly tapered surface defining a first notch to receive and position the container relative to the frame, the first notch facing a front or a rear of the chassis; and
a second interface coupled on and extending from a second side of the chassis, the second interface comprising a second groove to receive a second side portion of the container, the second groove at least partially defined by a second inwardly tapered surface, the first groove being separated from the second groove, the second inwardly tapered surface defining a second notch to receive and position the container relative to the frame, the second notch facing the same direction as the first notch.

17. The apparatus of claim 16, wherein the inwardly tapered surfaces seat the container into the respective first and second interfaces.

18. The apparatus of claim 16, wherein the first interface comprises a first outer guide and a first landing surface and wherein the second interface comprises a second outer guide and a second landing surface.

19. The apparatus of claim 16, further comprising an aperture to which an end of a hydraulic cylinder is to be coupled.

20. An apparatus, comprising:
a front axle;
a rear axle;

a frame coupling the front axle and the rear axle;
an engine cradle coupled to the frame and positioned between the front axle and the rear axle, a longitudinal axis of the engine cradle being transverse to a longitudinal axis of the frame; and
an adjustable bracket to couple the front axle or the rear axle to the frame, a first side of the adjustable bracket and a second side of the adjustable bracket being independently adjustable relative to the frame, the adjustable bracket enabling incremental adjustment of the front axle or the rear axle.

21. The apparatus claim 20, further comprising an engine coupled to the engine cradle, a longitudinal axis of the engine being substantially parallel to the front axle and the rear axle.

22. The apparatus of claim 21, wherein the engine is centrally located between the front axle and the rear axle.

\* \* \* \* \*